US012438294B2

(12) United States Patent
Ito et al.

(10) Patent No.: US 12,438,294 B2
(45) Date of Patent: Oct. 7, 2025

(54) HIGH-SPEED TRANSMISSION DEVICE, CABLE ASSEMBLY, AND HIGH-SPEED TRANSMISSION CONNECTOR

(71) Applicant: YAMAICHI ELECTRONICS CO., LTD., Tokyo (JP)

(72) Inventors: Toshiyasu Ito, Tokyo (JP); Osamu Shimizu, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 351 days.

(21) Appl. No.: 18/140,231

(22) Filed: Apr. 27, 2023

(65) Prior Publication Data

US 2023/0352864 A1 Nov. 2, 2023

Related U.S. Application Data

(63) Continuation of application No. 18/170,223, filed on Feb. 16, 2023.

(60) Provisional application No. 63/325,931, filed on Mar. 31, 2022.

(51) Int. Cl.
*H01R 12/71* (2011.01)
*H01R 12/75* (2011.01)

(52) U.S. Cl.
CPC ........... *H01R 12/75* (2013.01); *H01R 12/716* (2013.01)

(58) Field of Classification Search
CPC .. H01R 12/75; H01R 12/716; H01R 13/6471; H01R 13/6599; H01R 12/62; H01R 13/6594; H01R 24/60; H01R 12/79; H01R 12/775; H01R 13/652
See application file for complete search history.

(56) References Cited

U.S. PATENT DOCUMENTS

| | | | | |
|---|---|---|---|---|
| 7,267,575 | B1 * | 9/2007 | Hwang | H01R 13/6658 439/497 |
| 9,011,177 | B2 | 4/2015 | Lloyd | |
| 9,203,193 | B2 * | 12/2015 | Hackman | H01R 13/648 |
| 9,437,949 | B2 * | 9/2016 | Behziz | H01R 12/716 |
| 11,688,963 | B2 * | 6/2023 | Herring | H01R 13/65915 439/78 |
| 2006/0279371 | A1 | 12/2006 | Sato et al. | |
| 2014/0041937 | A1 | 2/2014 | Lloyd | |
| 2014/0322932 | A1 * | 10/2014 | Tran | H01R 12/81 29/857 |

(Continued)

*Primary Examiner* — Abdullah A Riyami
*Assistant Examiner* — Nelson R. Burgos-Guntin
(74) *Attorney, Agent, or Firm* — Hayes Soloway P.C.

(57) ABSTRACT

According to an embodiment, a high-speed transmission device includes a substrate, a control device on the substrate, a first connector, a second connector; and a cable assembly between the first connector and the second connector. The first connector is disposed at a position near the control device on the substrate and electrically connected to the control device via the substrate. The second connector is disposed at a position away from the control device on the substrate and equipped with an apparatus for transmitting/receiving a signal to and from the control device. The cable assembly includes a cable row, a paddle card substrate and a first conductive resin cover. Cables each transmitting a differential signal are arranged side by side in the cable row. The cables each comprise an internal conductor and an external conductor.

6 Claims, 40 Drawing Sheets

(56) References Cited

U.S. PATENT DOCUMENTS

| | | | | |
|---|---|---|---|---|
| 2015/0187461 | A1* | 7/2015 | Potterf | H01R 13/504<br>174/76 |
| 2016/0276759 | A1* | 9/2016 | Tran | H01R 13/6592 |
| 2017/0040746 | A1* | 2/2017 | Zhang | H01R 13/6594 |
| 2018/0287280 | A1* | 10/2018 | Ratkovic | H01R 12/62 |
| 2019/0067876 | A1 | 2/2019 | Tang et al. | |
| 2020/0194911 | A1* | 6/2020 | Ayzenberg | H01R 13/6581 |
| 2020/0274267 | A1* | 8/2020 | Zerebilov | H01R 13/502 |
| 2020/0328541 | A1 | 10/2020 | Lai et al. | |
| 2020/0366017 | A1* | 11/2020 | Blackburn | H01R 13/6594 |
| 2021/0036465 | A1 | 2/2021 | Tang et al. | |
| 2021/0313721 | A1* | 10/2021 | Little | H01R 13/6272 |

* cited by examiner

HIGH-SPEED TRANSMISSION DEVICE, CABLE ASSEMBLY, AND HIGH-SPEED TRANSMISSION CONNECTOR

CROSS-REFERENCE TO RELATED APPLICATION

This application is a Continuation of U.S. patent application Ser. No. 18/170,223 filed on Feb. 16, 2023, which claims priority to U.S. Provisional Patent Application No. 63/325,931, filed Mar. 31, 2022, the contents of which are incorporated herein by reference.

TECHNICAL FIELD

The present disclosure relates to high-speed signal transmission between an ASIC (application specific integrated circuit) and an optical transceiver, and particularly, relates to a high-speed transmission connector, a cable assembly, and a high-speed transmission device combining them.

BACKGROUND

As documents related to this type of technology, there are U.S. Patent publication 9011177B2 (Patent Document 1) and U.S. Patent publication 9203193B2 (Patent Document 2). In the high-speed interconnect cable assembly disclosed in Patent Document 1, a Twinax type by-pass cable is disposed between an ASIC and a terminal member of its peripheral edge portion on a circuit board, a connector member is connected to a terminal member, and a signal is transmitted to an external device via this connector member. In the electrical device disclosed in Patent Document 2, a by-pass cable on a circuit board is set to a communication cable including a differential pair of signal conductors, a shield layer enclosing the signal conductors, and a cable jacket surrounding the shield layer, an access opening portion for exposing a portion of the shield layer is provided in the cable jacket of the communication cable, and this access opening portion is electrically connected to a grounding contact on the substrate.

The transmission characteristics of the signal of this kind of circuit board depend on the frequency of the signal and the transmission distance of the signal, and the higher the frequency of the signal is, the shorter the transmittable distance becomes. The standard transmitting/receiving rate and the transmission distance in the case of signal transmission on the substrate are 50 cm for 50 Gbps, 25 cm for 100 Gbps, and 12.5 cm for 200 Gbps.

By the way, the inventor of the present application is trying to develop a technology for performing high-speed signal transmission of 112 Gbps or more between an ASIC and an optical transceiver. However, since the technologies of Patent Documents 1 and 2 merely connect the ASIC on the substrate and an apparatus away from it with a cable, there was a problem that the occurrence of crosstalk cannot be sufficiently prevented unless the distance between the apparatuses is brought close to about 25 cm when it comes to high-speed signal transmission of 112 Gbps or more.

SUMMARY

The present disclosure has been made in view of such a problem, and one of the objects is to provide technical means capable of preventing the occurrence of crosstalk when performing high-speed signal transmission between apparatuses disposed at separated positions on a substrate.

In accordance with a first aspect of the present disclosure, there is provided a high-speed transmission device including: a substrate; a control device provided on the substrate; a first connector disposed at a position near the control device on the substrate and electrically connected to the control device via the substrate; a second connector disposed at a position away from the control device on the substrate and equipped with an apparatus for transmitting/receiving a signal to and from the control device; and a cable assembly disposed between the first connector and the second connector. The cable assembly includes: a cable row in which a plurality of cables each transmitting a differential signal are arranged side by side; a paddle card substrate provided with first electrodes for signal and first electrodes for ground, in which front end portions of internal conductors of the plurality of cables are electrically connected to the first electrodes for signal, and front end portions of external conductors of the plurality of cables are electrically connected to the first electrodes for ground; and a first conductive resin cover covering the paddle card substrate, the internal conductors of the cables, and connection portions of the external conductors of the cables. The first conductive resin cover is not electrically connected to the first electrodes for signal, but is electrically connected to the first electrodes for ground.

In accordance with a second aspect of the present disclosure, there is provided a cable assembly disposed between a first connector disposed at a position near a control device on a substrate, and a second connector disposed at a position away from the control device on the substrate, including: a cable row in which a plurality of cables each transmitting a differential signal are arranged side by side; a paddle card substrate provided with electrodes for signal and electrodes for ground, in which internal conductors of the plurality of cables are electrically connected to the electrodes for signal, and external conductors of the plurality of cables are electrically connected to the electrodes for ground; and a conductive resin cover covering the paddle card substrate, the internal conductors of the cables, and connection portions of the external conductors of the cables. The conductive resin cover is not electrically connected to the electrodes for signal, but is electrically connected to the electrodes for ground.

In accordance with a third aspect of the present disclosure, there is provided a connector for high-speed transmission, including: an insulator with a slot into which a paddle card substrate is fitted; a plurality of contacts for signal disposed at a wall portion surrounding the slot of the insulator, and coming into contact with electrodes for signal of the paddle card substrate when the paddle card substrate is fitted into the slot; a plurality of contacts for ground disposed at a wall portion surrounding the slot, and coming into contact with electrodes for ground of the paddle card substrate when the paddle card substrate is fitted into the slot; and a conductive resin disposed in the insulator, wherein the conductive resin is not electrically connected to the contact for signal, but is electrically connected to the contact for ground.

In accordance with a fourth aspect of the present disclosure, there is provided a connector for high-speed transmission, including: an insulator with a slot into which a paddle card substrate is fitted; a plurality of contacts for signal disposed at a wall portion surrounding the slot of the insulator, and coming into contact with electrodes for signal of the paddle card substrate when the paddle card substrate is fitted into the slot; a plurality of contacts for ground which are disposed at a wall portion surrounding the slot and come into contact with electrodes for ground of the paddle card substrate when the paddle card substrate is fitted into the slot; and a metal member disposed in the insulator. The metal member may not be electrically connected to the contact for signal, but may be electrically connected to the contact for ground.

In accordance with a fifth aspect of the present disclosure, there is provided a cable assembly disposed between a first connector disposed at a position near a control device on a substrate, and a second connector disposed at a position away from the control device on the substrate, including: a cable row in which a plurality of cables each transmitting a differential signal are arranged side by side; a paddle card substrate provided with electrodes for signal and electrodes for ground, in which internal conductors of the plurality of cables are electrically connected to the electrodes for signal, and external conductors of the plurality of cables are electrically connected to the electrodes for ground; and a plastic member covering the internal conductors and connection portions of the electrodes for signal on the paddle card substrate.

DETAILED DESCRIPTION OF THE DRAWINGS

First Embodiment

Figure 1:
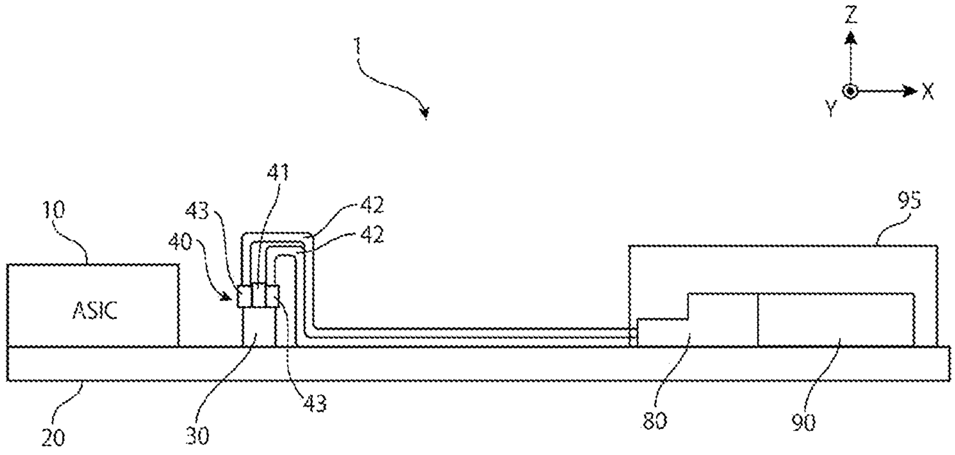
FIG. 1 is a side view of a high-speed transmission device 1 including an ASIC 10, a first connector 30, a cable assembly 40, and a second connector 80 according to a first embodiment of the present disclosure.

A high-speed transmission device 1 including a cable assembly 40, a first connector 30, and a second connector 80 according to the first embodiment of the present disclosure will be described. This high-speed transmission device 1 is mounted on a network switch or a server. The high-speed transmission device 1 includes: a rectangular substrate 20; an ASIC10 and an optical transceiver 90 disposed at positions separated by a predetermined distance (for example, 25 cm) on the substrate 20; a first connector 30, a cable assembly 40, and a second connector 80 disposed between the ASIC10 and the optical transceiver 90; and a cage 95 covering the optical transceiver 90 and the second connector 80. The optical transceiver 90 is attached to the second connector 80 and performs high-speed differential transmission of 112 Gbps or more by PAM (Pulse Amplitude Modulation) with the ASIC10. In the present embodiment, differential signals of sixteen channels can be transmitted between the ASIC10 and the optical transceiver 90.

In the following explanation, the direction where the ASIC10 and the optical transceiver 90 are separated on the substrate 20 is appropriately referred to as an X direction, one direction orthogonal to the X direction is appropriately referred to as an Y direction, and a direction orthogonal to both the X direction and the Y direction is appropriately referred to as a Z direction. In addition, when viewed from the optical transceiver 90 in the X direction, the −X side, which is the side where the ASIC 10 is located, may be referred to as a front side, and the opposite +X side may be referred to as a rear side. In addition, when viewed from the substrate 20 in the Z direction, the +Z side, which is the side where the ASIC10 and the optical transceiver 90 are located, may be referred to as an upper side, and the opposite −Z side may be referred to as a lower side. In addition, the +Y side when viewed from the rear side in the X direction may be referred to as a left side, and the −Y side when viewed from the rear side may be referred to as a right side.

In FIG. 1, respective pairs of +terminal and −terminal of differential signals each corresponding to one channel are exposed on the lower surface of the ASIC10. Each pair of +terminal and −terminal of the ASIC10 is soldered to pads (not shown) of the substrate 20.

Figure 2:
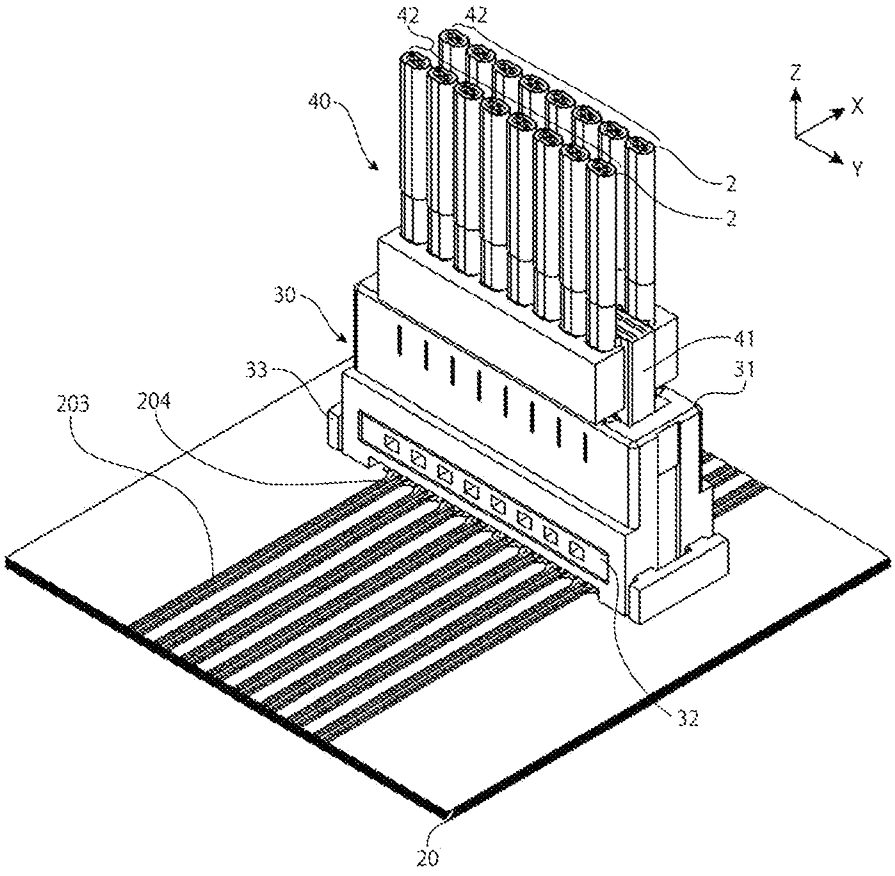
FIG. 2 is a perspective view of the cable assembly 40, the first connector 30, and the substrate 20 in FIG. 1.
Figure 3:
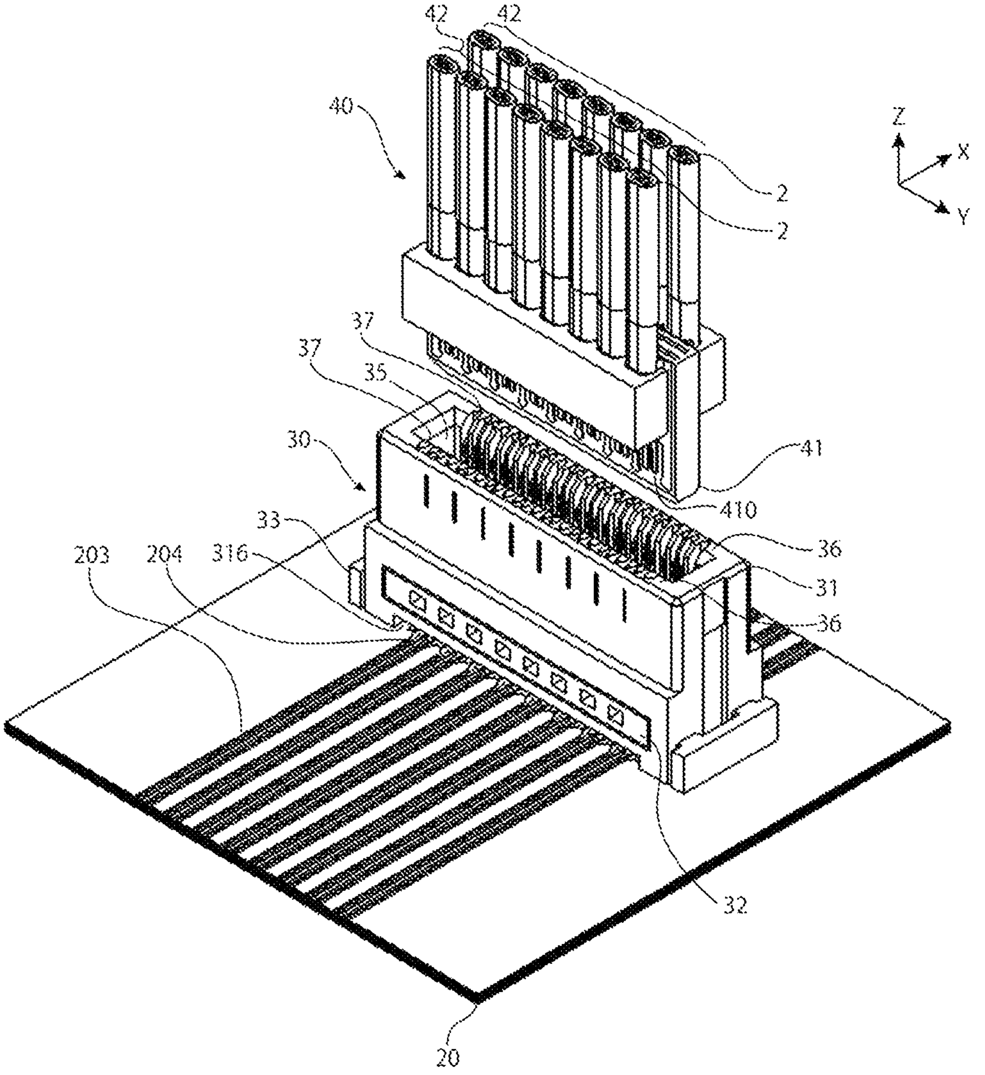
FIG. 3 is a diagram showing a state where the cable assembly 40 is removed from the first connector 30 in FIG. 2.

The first connector 30 is disposed at a position near the rear side of the ASIC10 on the substrate 20. The distance between the ASIC10 and the first connector 30 is, for example, 5 cm. As shown in FIG. 2 and FIG. 3, the first connector 30 has a first insulator 31, a contact 3, and second conductive resins 32.

The first insulator 31 has an outline in which portions of the upper side of the front surface and rear surface of a rectangular parallelepiped are notched. The first insulator 31 is provided with a first slot 35. The first slot 35 penetrates between the upper surface and the lower surface of the first insulator 31. The inner surfaces of the wall portions 36 surrounding the first slot 35 from the front and rear in the first insulator 31 are provided with twenty five narrow grooves 37, respectively. The lower surfaces of the front and rear wall portions 36 are scooped upward as the first recess portions 316.

Contacts 3 are arranged in the twenty five narrow grooves 37 of the front and rear wall portions 36 of the first insulator 31. One linear portion of the contact 3 is pressed into the narrow groove 37, and the substrate side contact portion at the tip end of the other linear portion is exposed from the first recess portion 316.

Here, among the twenty five contacts 3 of the front and rear wall portions 36, the contacts 3 at both the left and right ends, and every two contacts 3 arranged between them are contacts for ground, and the contacts 3 sandwiched between the contacts for ground are contacts for differential signal. Hereinafter, letter (G) is attached to the contact for ground and letter(S) is attached to the contact for differential signal to distinguish between the two kinds of contacts.

Figure 4:
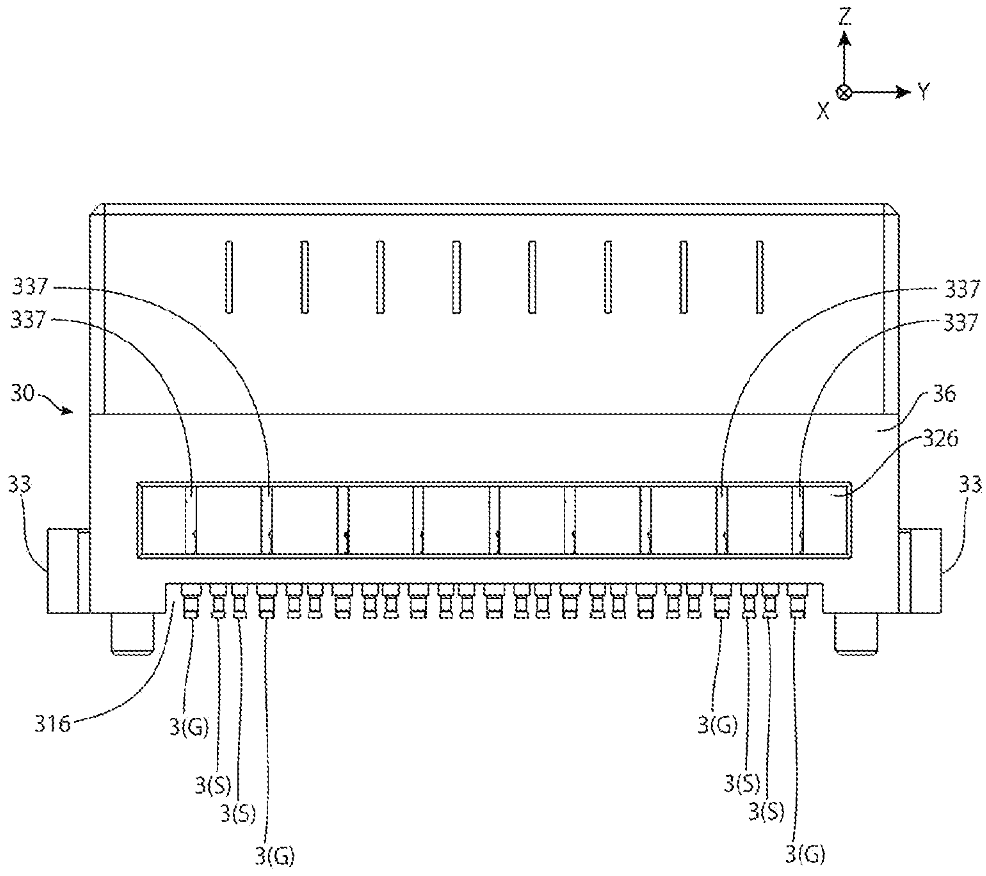
FIG. 4 is a diagram of the first connector of FIG. 1 as viewed from an −X side.

Second recess portions 326 are provided on the lower sides of the front and rear wall portions 36 of the first insulator 31. The second recess portion 326 is recessed inward from the outer surface of the wall portion 36. The second recess portion 326 has a rectangular shape with substantially the same left-right width as that of the first slot 35. As shown in FIG. 4, there are nine slits 337 inside the second recess portions 326 of the front and rear wall portions 36, and the slits 337 are located at positions corresponding to the contacts 3 (G), respectively. The slit 337 reaches the narrow groove 37 through the wall portion 36.

Figure 5:
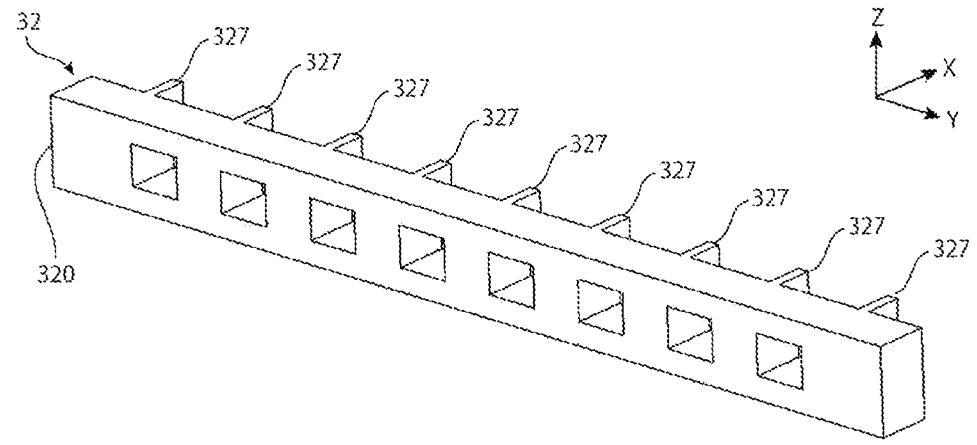
FIG. 5 is a perspective view of the second conductive resin 32 of FIG. 2.

As shown in FIG. 5, the second conductive resin 32 is formed by projecting nine protrusion portions 327 from one surface of an approximately rectangular parallelepiped shaped main body portion 320. The second conductive resin 32 is disposed in the first insulator 31 and fitted into the second recess portion 326 of the first insulator 31. The protrusion portion 327 of the second conductive resin 32 passes through the slit 337 and comes into contact with the contact 3 (G) in the narrow groove 37 at the back thereof. In a state where the second conductive resin 32 is fitted into the second recess portion 326, the second conductive resin 32 is not electrically connected to the contact 3 (S) but is electrically connected to the contact 3 (G).

Figure 6:
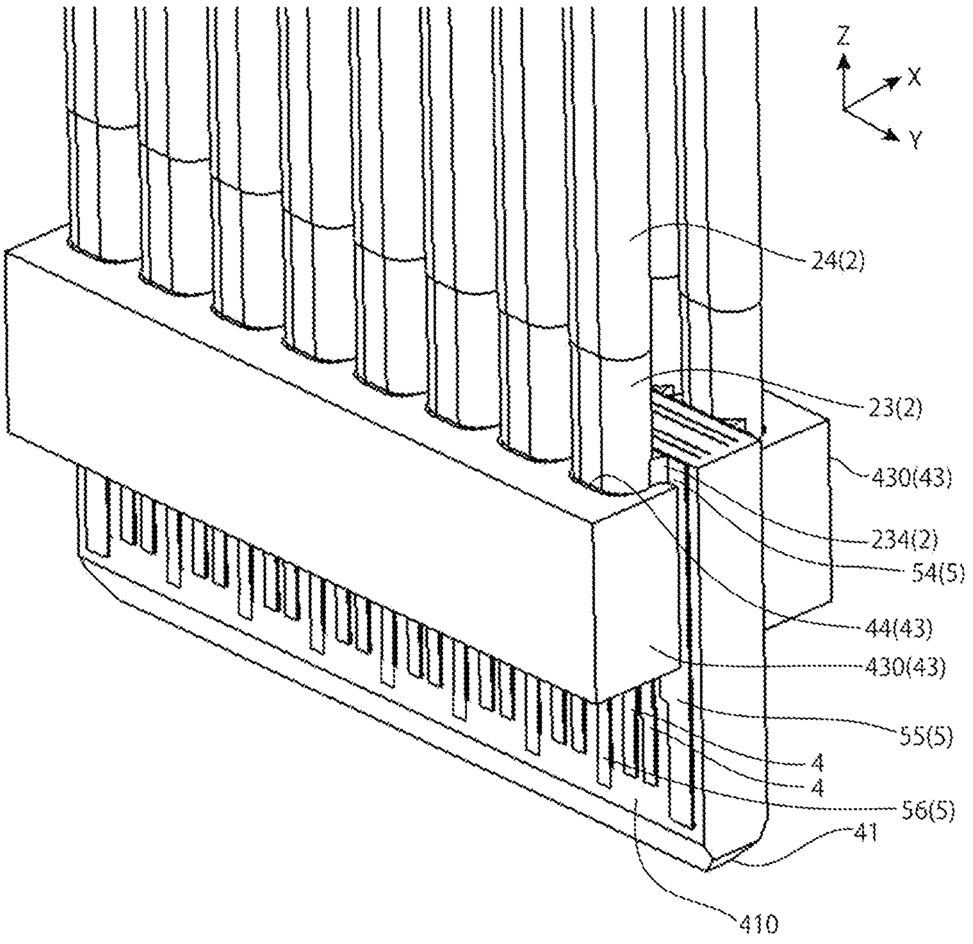
FIG. 6 is an enlarged view of the cable assembly 40 of FIG. 3.
Figure 8:
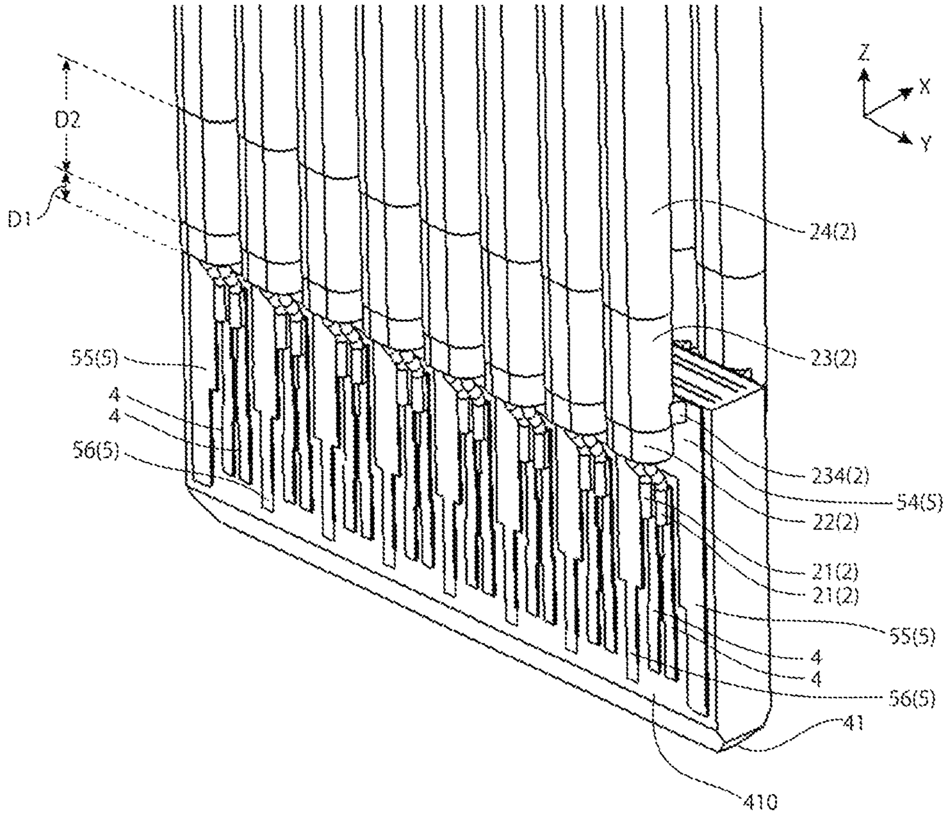
FIG. 8 is a diagram showing the cable assembly 40 of FIG. 6 from which the first conductive resin cover 43 is removed.
Figure 9:
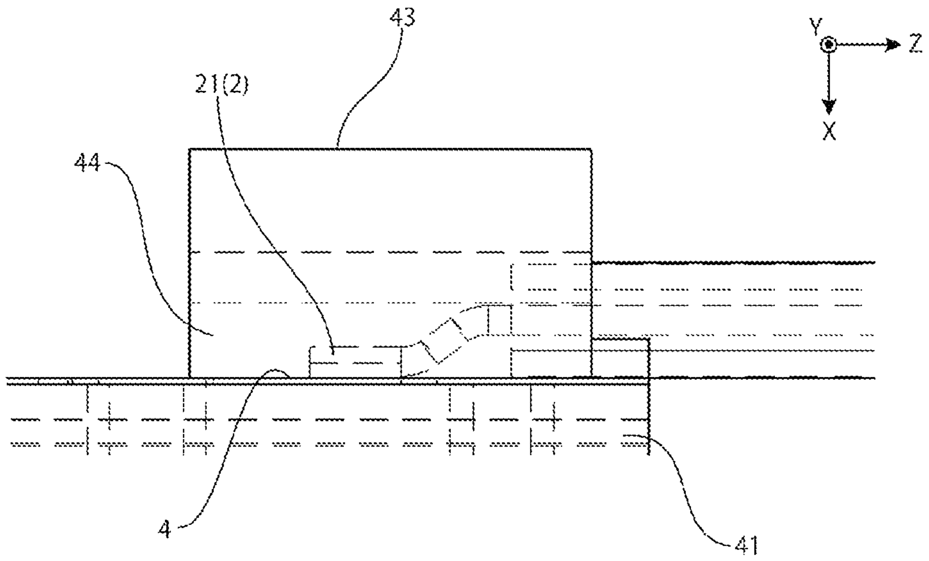
FIG. 9 is a cross-sectional view of a peripheral portion of the first conductive resin cover 43 in FIG. 1 cut along a plane parallel to an XZ plane.

As shown in FIG. 3, FIG. 6, and FIG. 8, the cable assembly 40 has a cable row 42 in which eight Twinax cables 2 are arranged side by side on the left and right, a paddle card substrate 41, and a first conductive resin cover 43.

The Twinax cable 2 has two internal conductors 21, a dielectric body 22, an external conductor 23, and a jacket 24. The two internal conductors 21 are arranged in parallel, and each of the internal conductors 21 is covered by the dielectric body 22. The external conductor 23 covers a bundle of two dielectric bodies 22, and the jacket 24 covers the external conductor 23.

The paddle card substrate 41 is provided with first electrodes 4 for signal and first electrodes 5 for ground on the front and rear surface layer surfaces 410 of the multilayer substrate. The front end portions of the internal conductors 21 of the Twinax cable 2 are electrically connected to the first electrodes 4 for signal of the paddle card substrate 41, and the front end portion of the external conductor 23 of the Twinax cable 2 is electrically connected to the first electrode 5 for ground of the paddle card substrate 41.

More specifically, the paddle card substrate 41 has a rectangular plate shape with substantially the same left-right width and thickness as those of the first slot 35. There are sixteen first electrodes 4 for signal on the front and rear surface layer surfaces 410 of the paddle card substrate 41, respectively. The first electrode 4 for signal has an elongated rectangular shape. The sixteen first electrodes 4 for signal on the front and rear surface layer surfaces 410 are paired by two.

The first electrodes 5 for ground are provided around the first electrodes 4 for signal on the front and rear surface layer surfaces 410 of the paddle card substrate 41. The first electrode 5 for ground has a comb-toothed shape. The base portion 54 of the first electrode 5 for ground occupies substantially the entire surface on the upper side of the first electrode 4 for signal on the surface layer surface 410, and two first extension portions 55 at both the left and right ends and seven second extension portions 56 between the two first extension portions 55 extend downward from the base portion 54. On the inner side of the surface layer surface 410, the pairs of the first electrodes 4 for signal and the second extension portions 56 are alternatively arranged side by side at intervals between the left and right first extension portions 55.

Figure 7:
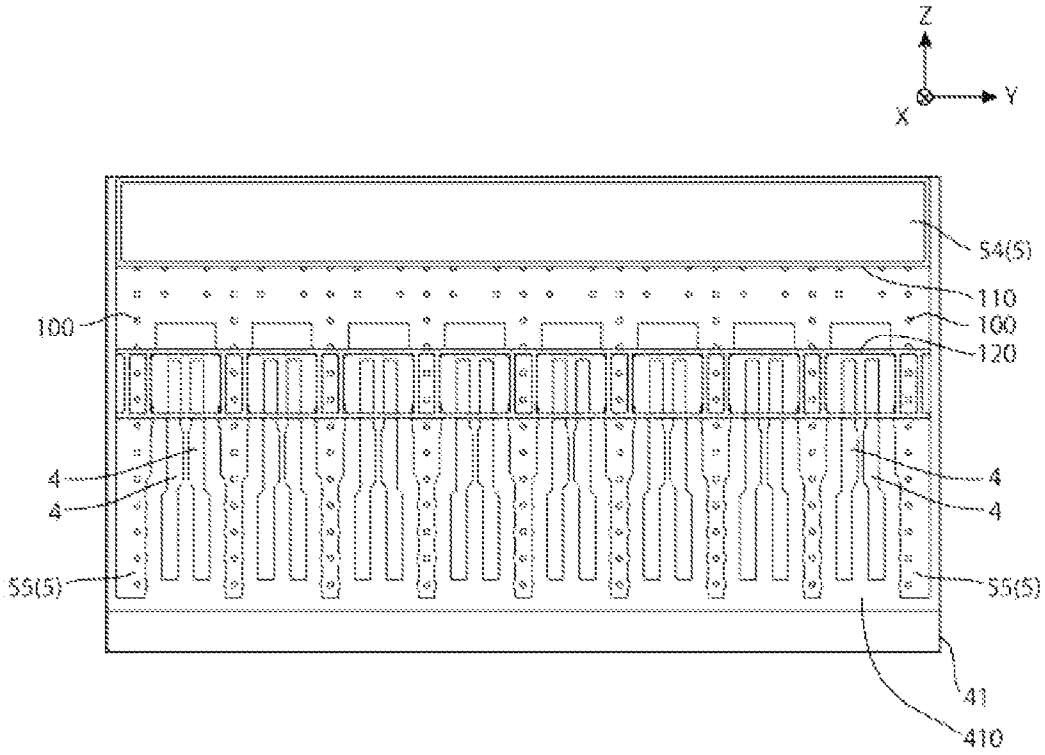
FIG. 7 is a diagram showing a surface layer surface 410 of the cable assembly 40 of FIG. 6 and solder resists 110 and 120.

As shown in FIG. 7, there are a plurality of through holes 100 penetrating between the front and rear surface layer surfaces 410 at portions where the first electrodes 5 for ground are provided in the paddle card substrate 41. The first electrodes 5 for ground of the front and rear surface layer surfaces 410 are electrically connected through the through holes 100. Further, a solder resist 110 is provided at a position overlapping the base portion 54 of the first electrode 5 for ground on the surface layer surface 410 of the paddle card substrate 41, and a solder resist 120 is provided at a position overlapping the extension portions 55, 56 of the first electrode 5 for ground and the first electrodes 4 for signal. The solder resist 110 has a rectangular shape with substantially the same left-right width as that of the base portion 54. The solder resist 120 has a shape in which rectangular shapes with substantially the same left-right width as the intervals between the second extension portions 56 and rectangular shapes with substantially the same left-right width as that of the second extension portion 56 itself are alternately connected in the left-right direction. Approximately half of the upper side of the base portion 54 of the first electrode 5 for ground is surrounded by the solder resist 110, and the upper edge portion of the first electrode 4 for signal is surrounded by a portion corresponding to a rectangular peripheral edge with a large left-right width in the solder resist 120. In addition, a through hole 100 is provided in a region of the base portion 54 of the first electrode 5 for ground surrounded by the solder resist 110.

The lower ends of the first extension portion 55 and the second extension portion 56 reach the lower side with respect to the lower end of the first electrode 4 for signal. The left-right widths of the first extension portion 55 and the second extension portion 56 become narrow on the way to reach the lower ends. The left-right width of the narrowed portion of the second extension portion 56 is substantially the same as that of the left-right width of the first electrode 4 for signal.

As shown in FIG. 8, internal conductors 21 project from the lower end portions of the Twinax cables 2 in the front and rear two cable rows 42. At a portion from the end portion to the upper side by width D1 in the Twinax cable 2, the jacket 24 and the external conductor 23 are peeled off, and the dielectric body 22 is exposed. At a portion from the exposed portion of the dielectric body 22 to the upper side by width D2 (D2>D1) in the Twinax cable 2, the jacket 24 is peeled off, and the external conductor 23 is exposed.

A portion of the exposed portion of the external conductor 23 of the Twinax cable 2 is pulled out to the side of the paddle card substrate 41 as a substrate side contact portion 234, and this substrate side contact portion 234 is soldered to an upper portion of the base portion 54 of the first electrode 5 for ground of the paddle card substrate 41. Further, the projecting portions of the internal conductors 21 of the Twinax cable 2 are soldered to the upper edge portions of the first electrodes 4 for signal of the paddle card substrate 41. As described above, approximately half of the upper side of the base portion 54 of the first electrode 5 for ground is surrounded by the solder resist 110, and the upper edge portion of the first electrode 4 for signal is surrounded by the solder resist 120. Solder flow is prevented by these solder resists 110 and 120. Further, since the through hole 100 is not provided in the region of the base portion 54 of the first electrode 5 for ground surrounded by the solder resist 110, the heat of the first electrode 5 for ground is difficult to escape, and good soldering can be perform.

The first conductive resin cover 43 is provided with eight arch grooves 44 on one surface of the approximately rectangular parallelepiped shaped main body portion 430. The eight arch grooves 44 are arranged at the same intervals as the eight Twinax cables 2 in the cable row 42. Each arch groove 44 is shaped to bypass the Twinax cable 2 and is curved along the outline of the Twinax cable 2.

The first conductive resin cover 43 is fixed to the paddle card substrate 41 so as to cover the solder joining portion of the paddle card substrate 41. The Twinax cable 2 is contained in the arch groove 44 of the first conductive resin cover 43. Flat surface portions on both sides of the arch groove 44 in the first conductive resin cover 43 are fixed to the base portion 54, the first extension portion 55 and the second extension portion 56 of the first electrode 5 for ground of the paddle card substrate 4 by a conductive resin or an adhesive. The first conductive resin cover 43 may be fixed to the paddle card substrate 41 by a mechanical pressing mechanism. In a state where the first conductive resin cover 43 is fixed to the paddle card substrate 41, the arch groove 44 of the first conductive resin cover 43 straddles the first electrode 4 for signal to avoid contact between the first conductive resin cover 43 and the first electrode 4 for signal. Therefore, the first conductive resin cover 43 is not electrically connected to the first electrode 4 for signal, but is electrically connected to the first electrode 5 for ground.

The upper and lower dimensions of the first conductive resin cover 43 are smaller than the upper and lower dimensions of the paddle card substrate 41. As shown in FIG. 6, in a state where the first conductive resin cover 43 is fixed to the paddle card substrate 41, the arch groove 44 of the first conductive resin cover 43 covers the exposed portion of the dielectric body 22 in the Twinax cable 2 and approximately half of the upper side of the entire electrode of the paddle card substrate 41, and a portion of the lower side of the first electrode 4 for signal and portions of the lower sides of the first extension portion 55 and the second extension portion

56 of the first electrode 5 for ground are exposed without being covered by the first conductive resin cover 43.

When the paddle card substrate 41 is fitted into the first slot 35 of the first connector 30, the first electrode 4 for signal of the paddle card substrate 41 comes into contact with the contact 3 (S) of the first connector 30, and the first electrode 5 for ground of the paddle card substrate 41 comes into contact with the contact 3 (G) of the first connector 30.

As shown in FIG. 2, a wiring 203 directed rearward from the fixed positions of the +terminal and the −terminal of the ASIC10 on the substrate 20 is laid on the substrate 20, and an electrode 204 is provided on the wiring 203. The substrate side contact portions of the tip ends of the contacts 3 (G) and 3 (S) of the first connector 30 are connected to the electrode 204.

Figure 10:
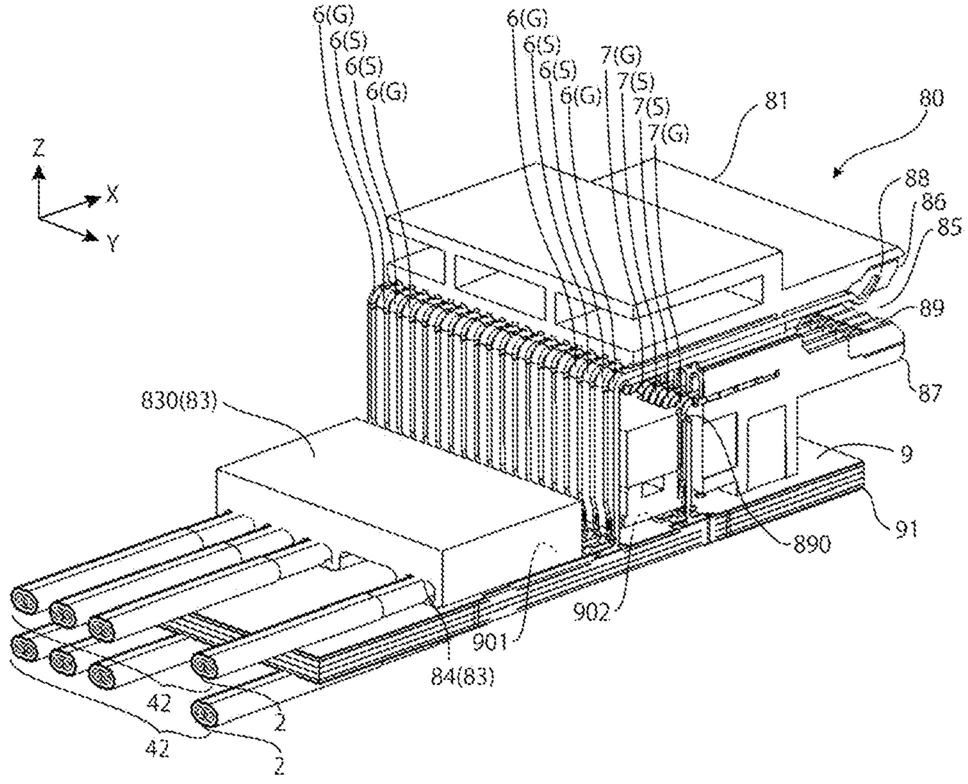
FIG. 10 is a cross-sectional view of the second connector 80 in FIG. 2 cut along a plane parallel to the XZ plane.
Figure 11:
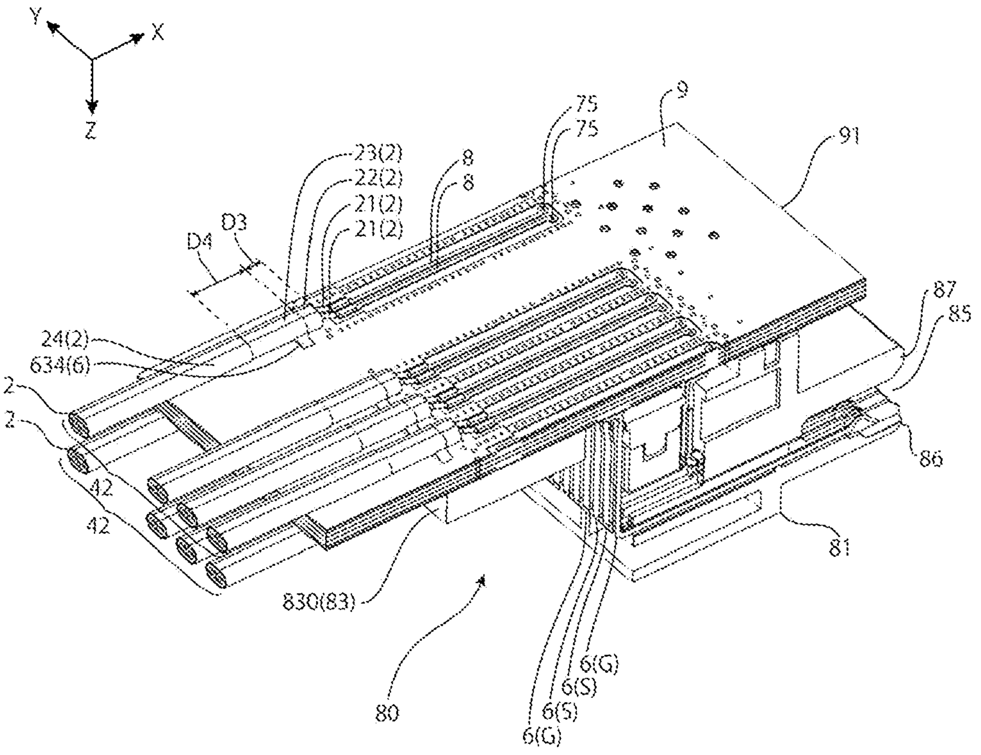
FIG. 11 is a cross-sectional view of the second connector 80 of FIG. 10 as viewed from another angle.

FIG. 10 is a cross-sectional view of the cable row 42 and the second connector 80 cut at a plane parallel to the XZ plane. FIG. 11 is a diagram of FIG. 10 as viewed from another angle. Here, in FIG. 10 and FIG. 11, for the sake of convenience, among eight Twinax cables 2 forming the upper and lower cable rows 42, three at the left end and one at the right are omitted. In addition, in FIG. 10 and FIG. 11, for the sake of convenience, the lower one of the two third conductive resin covers 83 provided on the second connector 80 is omitted.

The second connector 80 has a second insulator 81, a connector substrate 91, a third conductive resin cover 83, contacts 6 (G) and 7 (G) for ground, and contacts 6 (S) and 7 (S) for differential signal. The rear end portions of the internal conductors 21 of the Twinax cable 2 are electrically connected to the second electrodes 8 for signal or the third electrodes 901 for signal of the connector substrate 91, and the rear end portion of the external conductor 23 of the Twinax cable 2 is electrically connected to the second electrode 9 for ground of the connector substrate 91.

More specifically, the second insulator 81 is provided with a second slot 85. A header of an optical transceiver 90 is fitted into the second slot 85. Of the wall portions 86 and 87 surrounding the second slot 85 in the second insulator 81 from above and below, the wall portion 86 on the upper side is provided with twenty five narrow grooves 88, and the wall portion 87 on the lower side is provided with twenty five narrow grooves 89.

Contacts 6 (G) and 6 (S) are arranged in the twenty five narrow grooves 88 of the wall portion 86 on the upper side of the second insulator 81, respectively, and contacts 7 (G) and 7 (S) are arranged in the twenty five narrow grooves 89 of the wall portion 87 on the lower side, respectively.

Linear portions on the rear sides of the contacts 6 (G) and 6 (S) are pressed into the narrow grooves 88, and portions on the front sides thereof reach the lower side of the lower surface of the second insulator 81 along the front surface of the second insulator 81. Linear portions on the rear sides of the contacts 7 (G) and 7 (S) are pressed into the narrow grooves 89, and portions on the front sides thereof reach the lower side of the lower surface of the second insulator 81 through the through holes 890 of the second insulator 81.

In the connector substrate 91, a second electrode 8 for signal and a second electrode 9 for ground are provided on the lower surface layer surface of the multilayer substrate, and a third electrode 901 for signal, a fourth electrode 902 for signal and a second electrode 9 for ground are provided on the upper surface layer surface. The connector substrate 91 is fixed to the lower side of the second insulator 81. The second electrode 8 for signal on the lower surface layer surface of the connector substrate 91 extends thin and long in the X direction. The second electrode 8 for signal, the third electrode 901 for signal and the fourth electrode for signal 902 are paired by two. The rear end portion of the second electrode 8 for signal of the lower surface layer surface is provided with a through hole 75 penetrating the connector substrate 91, and is connected to the fourth electrode 902 for signal on the upper side through the through hole.

A second electrode 9 for ground is provided around the second electrode 8 for signal on the lower surface layer surface, and the third electrode 901 for signal and the fourth electrode 902 for signal on the upper surface layer surface of the connector substrate 91. That is, the second electrode 9 for ground occupies substantially the entire surface of a portion of the upper and lower surface layer surfaces of the connector substrate 91 where there is no electrode for signal.

The end portion of the contact 6 (G) extending to the side of the connector substrate 91 is soldered to the second electrode 9 for ground of the upper surface layer surface of the connector substrate 91. The end portion of the contact 6 (S) extending to the side of the connector substrate 91 is soldered to the third electrode 901 for signal of the upper surface layer surface of the connector substrate 91.

The end portion of the contact 7 (G) extending to the side of the connector substrate 91 is soldered to the second electrode 9 for ground of the upper surface layer surface of the connector substrate 91. The end portion of the contact 7 (S) extending to the side of the connector substrate 91 is soldered to the fourth electrode 902 for signal of the upper surface layer surface near the through hole 75 of the connector substrate 91.

The internal conductors 21 project from the rear end portions of the Twinax cable 2 in the upper and lower two cable rows 42. As shown in FIG. 11, at a portion from the end portion to the front side by width D1 in the Twinax cable 2, the jacket 24 and the external conductor 23 are peeled off, and the dielectric body 22 is exposed. At a portion from the exposed portion of the dielectric body 22 to the front side by width D4 (D4>D3) in the Twinax cable 2, the jacket 24 is peeled off, and the external conductor 23 is exposed.

A portion of the exposed portion of the external conductor 23 of the Twinax cable 2 of the cable row 42 on the upper side is pulled out to the side of the connector substrate 91 as a substrate side contact portion 634, and this substrate side contact portion 634 is soldered to the second electrode 9 for ground of the connector substrate 91. The projecting portions of the internal conductors 21 of the Twinax cable 2 of the cable row 42 on the upper side are soldered to the third electrodes 901 for signal of the connector substrate 91.

A portion of the exposed portion of the external conductor 23 of the Twinax cable 2 of the cable row 42 on the lower side is pulled out to the side of the connector substrate 91 as a substrate side contact portion 634, and this substrate side contact portion 634 is soldered to the electrode 9 for ground of the connector substrate 91. The projecting portions of the internal conductors 21 of the Twinax cable 2 of the cable row 42 on the lower side are soldered to the second electrodes 8 for signal of the connector substrate 91.

The third conductive resin cover 83 is provided with an arch groove 84 on one surface of the approximately rectangular parallelepiped shaped main body portion 830. The arch groove 84 is curved along the outline of the Twinax cable 2.

The third conductive resin cover 83 is fixed to the connector substrate 91 so as to cover both the connection portions between the second electrodes 8 for signal of the connector substrate 91 and the internal conductors 21 of the Twinax cable 2, and the connection portions between the substrate side contact portions 634 of the cables and the second electrode 9 for ground. The Twinax cable 2 fits in the arch groove 84 of the third conductive resin cover 83. In a state where the third conductive resin cover 83 is fixed to the connector substrate 91, the third conductive resin cover 83 is not electrically connected to the second electrode 8 for signal, but is electrically connected to the second electrode 9 for ground.

The details of the configuration of the present embodiment are explained above. The high-speed transmission device 1 according to the present embodiment includes: a substrate 20; an ASIC10, which is a control device, provided on the substrate 20; a first connector 30, which is a connector for high-speed transmission, disposed at a position near the ASIC10 on the substrate 20 and electrically connected to the ASIC10 via the substrate 20; a second connector 80, which is a connector for high-speed transmission, disposed at a position away from the ASIC10 on the substrate 20 and equipped with an optical transceiver 90 for transmitting/receiving a signal to and from the ASIC10; and a cable assembly 40 disposed between the first connector 30 and the second connector 80. The cable assembly 40 includes: a cable row 42 in which a plurality of Twinax cables 2 each transmitting a differential signal of one channel are arranged side by side; a paddle card substrate 41 provided with first electrodes 4 for signal and first electrodes 5 for ground, in which the front end portions of the internal conductors 21 of the plurality of Twinax cables 2 are electrically connected to the first electrodes 4 for signal, and the front end portions of the external conductors 23 of the plurality of Twinax cables 2 are electrically connected to the first electrodes 5 for ground; and a first conductive resin cover 43 covering the internal conductors of the cables and the connection portions of the external conductors of the cables of the paddle card substrate 41. Wherein, the first conductive resin cover 43 is not electrically connected to the first electrodes 4 for signal, but is electrically connected to the first electrodes 5 for ground. Thus, it is possible to prevent the occurrence of crosstalk when performing high-speed signal transmission between the ASIC10 and the optical transceiver 90 disposed at separated positions on the substrate 20. In particular, when the ASIC10 is disposed in the center of the substrate 20 and a plurality of optical transceivers 90 are disposed around the ASIC10, the distance between the ASIC10 and the optical transceiver 90 disposed at a corner of the substrate 20 must be long. In such a case, the occurrence of crosstalk can be prevented even in the communication between the ASIC10 and the optical transceiver 90 at the corner, and good electrical characteristics can be secured.

Figure 12:
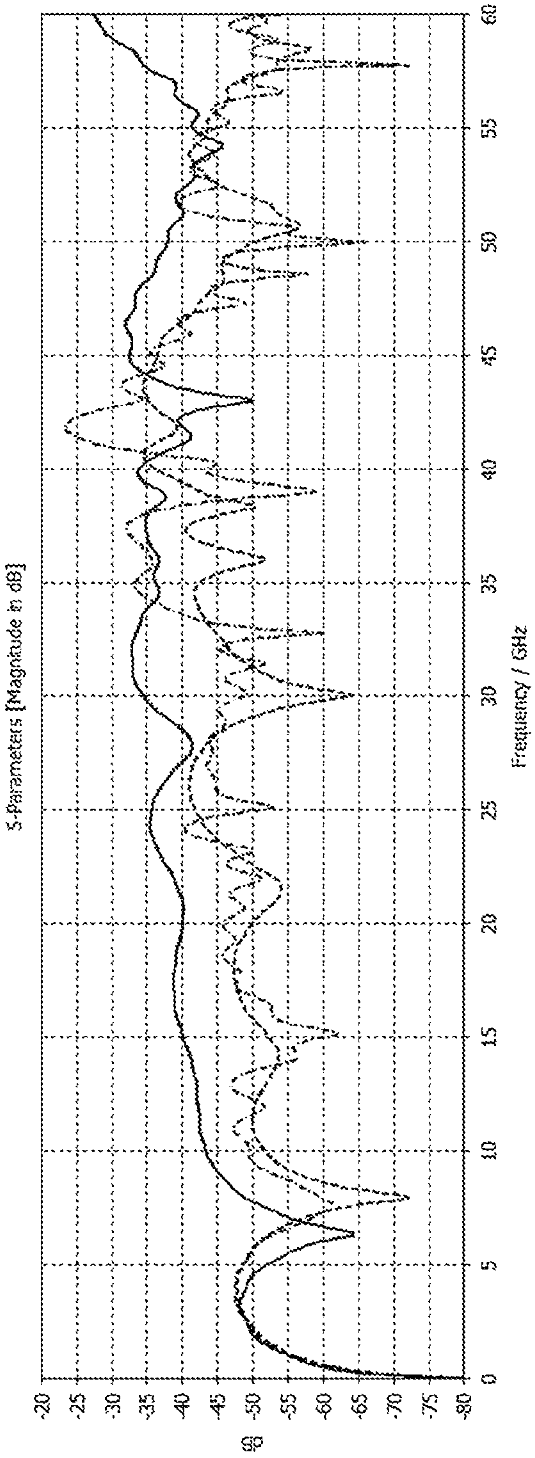
FIG. 12 is a diagram showing respective frequency characteristics of a NEXT of the cable assembly 40 and the first connector 30, a NEXT of the cable assembly 40 and the first connector 30 without the first conductive resin cover 43 and the second conductive resins 32, and a NEXT of the cable assembly 40 and the first connector 30 without the second conductive resins 32.

Here, the inventor of the present application performed the following verification to confirm the effect of the present disclosure. First, the inventor of the present application calculated respective frequency characteristics of the NEXT (Near End Cross Talk) of the cable assembly 40 and the first connector 30, the NEXT of the cable assembly 40 and the first connector 30 without the second conductive resins 32, and the NEXT of the cable assembly 40 and the first connector 30 without the first conductive resin cover 43 and the second conductive resins 32 by using an electromagnetic field analysis software. FIG. 12 is a diagram showing this simulation result. In FIG. 12, the broken line is the frequency characteristic of the cable assembly 40 and the first connector 30, the one-dot chain line is the frequency characteristic of the cable assembly 40 and the first connector 30 without the second conductive resins 32, and the solid line is the frequency characteristic of the cable assembly 40 and the first connector 30 without the first conductive resin cover 43 and the second conductive resins 32.

Referring to FIG. 12, it can be seen that the NEXT of the cable assembly 40 and the first connector 30 of the present embodiment is about 5 dB to 10 dB smaller than those without the first conductive resin cover 43 or without the second conductive resins 32 over a wide band of 10 GHz to 60 GHz.

Figure 13:
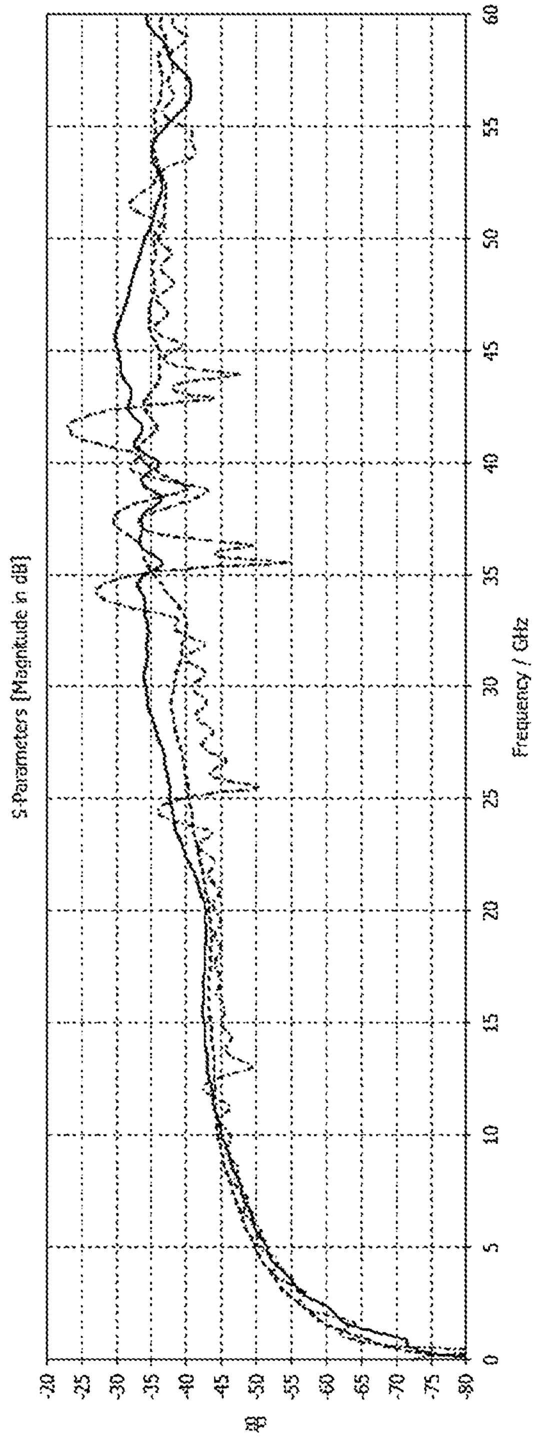
FIG. 13 is a diagram showing respective frequency characteristics of a FEXT of the cable assembly 40 and the first connector 30, a FEXT of the cable assembly 40 and the first connector 30 without the first conductive resin cover 43 and the second conductive resins 32, and a FEXT of the cable assembly 40 and the first connector 30 without the second conductive resins 32.

Second, the inventor of the present application calculated respective frequency characteristics of the FEXT (Far End Cross Talk) of the cable assembly 40 and the first connector 30, the FEXT of the cable assembly 40 and the first connector 30 without the second conductive resins 32, and the FEXT of the cable assembly 40 and the first connector 30 without the first conductive resin cover 43 and the second conductive resins 32 by using an electromagnetic field analysis software. FIG. 13 is a diagram showing this simulation result. In FIG. 13, the broken line is the frequency characteristic of the cable assembly 40 and the first connector 30, the one-dot chain line is the frequency characteristic of the cable assembly 40 and the first connector 30 without the second conductive resins 32, and the solid line is the frequency characteristic of the cable assembly 40 and the first connector 30 without the first conductive resin cover 43 and the second conductive resins 32.

Referring to FIG. 13, it can be seen that the FEXT of the cable assembly 40 and the first connector 30 of the present embodiment is about 5 dB smaller than those without the first conductive resin cover 43 or without the second conductive resins 32 in the band of 30 GHz to 35 GHz and the band of 42 GHz to 50 GHz.

Figure 14:
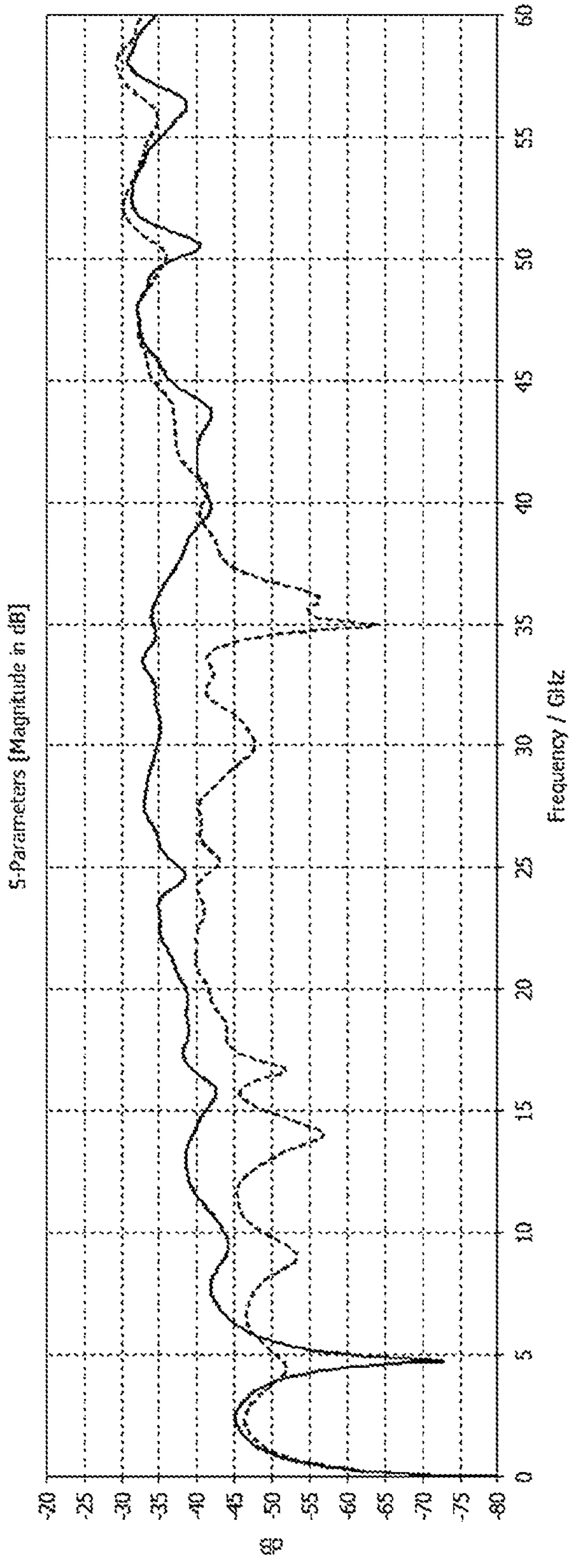
FIG. 14 is a diagram showing respective frequency characteristics of a NEXT of the second connector 80, and a NEXT of the second connector 80 without the third conductive resin cover 83.

Third, the inventor of the present application calculated respective frequency characteristics of the NEXT of the second connector 80 and the NEXT of the second connector 80 without the third conductive resin cover 83 by using an electromagnetic field analysis software. FIG. 14 is a diagram showing this simulation result. In FIG. 14, the broken line is the frequency characteristic of the second connector 80, and the solid line is the frequency characteristic of the second connector 80 without the third conductive resin cover 83.

Referring to FIG. 14, it can be seen that the NEXT of the second connector 80 of the present embodiment is about 5 dB to 20 dB smaller than that without the third conductive resin cover 83 in the band of 5 GHz to 40 GHz.

Figure 15:
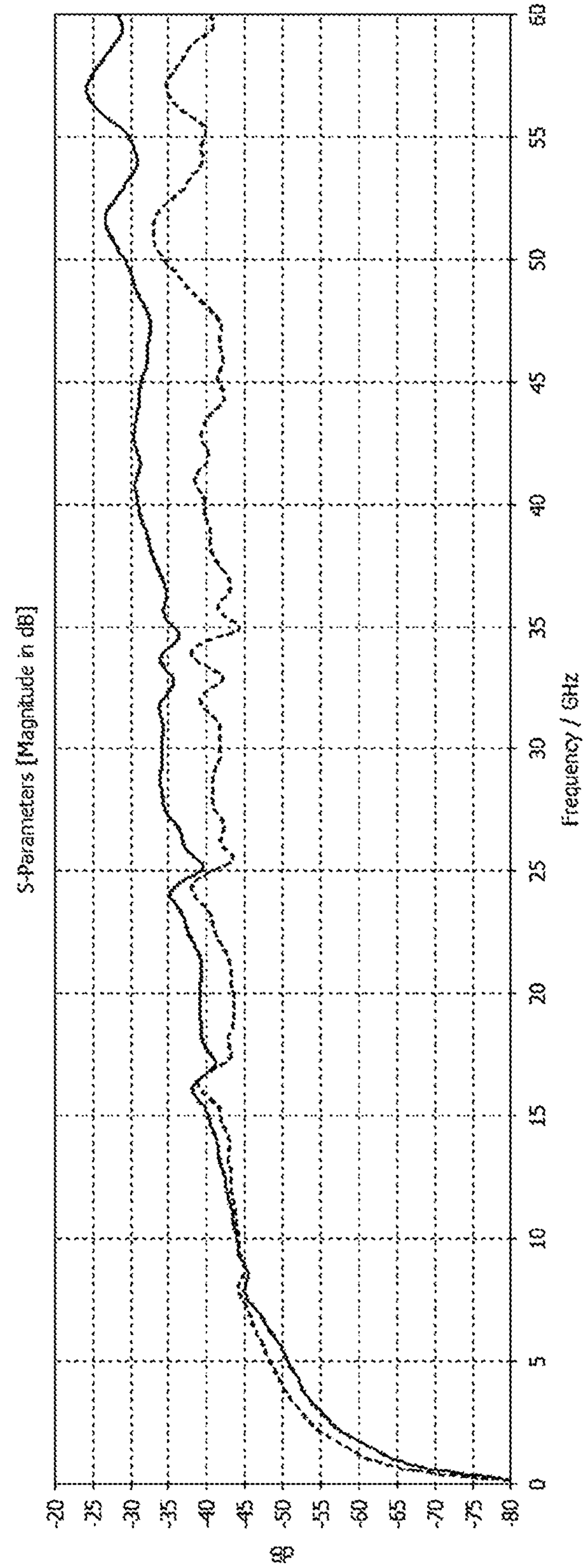
FIG. 15 is a diagram showing respective frequency characteristics of a FEXT of the second connector 80, and a FEXT of the second connector 80 without the third conductive resin cover 83.

Fourth, the inventor of the present application calculated respective frequency characteristics of the FEXT of the second connector 80 and the FEXT of the second connector 80 without the third conductive resin cover 83 by using an electromagnetic field analysis software. FIG. 15 is a diagram showing this simulation result. In FIG. 15, the broken line is the frequency characteristic of the second connector 80, and the solid line is the frequency characteristic of the second connector 80 without the third conductive resin cover 83.

Referring to FIG. 15, it can be seen that the FEXT of the second connector 80 of the present embodiment is about 5 to 10 dB smaller than that without the third conductive resin cover 83 in the band of 15 GHz or higher.

Further, in the above embodiment, the Twinax cable 2 transmitting a differential signal of one channel may be replaced with two coaxial cables each transmitting the +signal and −signal of the differential signal.

Further, in the above embodiment, the arch groove 44 of the first conductive resin cover 43 may be replaced with a groove recessed in a shape (for example, rectangular shape) different from the curved shape.

Further, the number of the Twinax cables 2 forming the cable row 42 may be two to seven or nine or more. Further, the number of the second connectors 80 and the optical transceivers 90 on the substrate 20 may be two or more. For example, a plurality of the second connectors 80 and the optical transceivers 90 may be disposed at respective positions surrounding the ASIC10 on the substrate 20, and a same number of the first connectors 30 as the second connector 80 may be disposed in the vicinity of the ASIC10, and the first connectors 30 and the second connectors 80 may be connected via the cable assembly 40, respectively.

Further, in the above embodiment, the protrusion portion 327 of the second conductive resin 32 is electrically connected to the contact 3 (G), but the protrusion portion 327 may be disposed at a distance from the contact 3 (G) at which a high frequency of 1 GHz or higher can be electrically connected. Normally, the distance between the protrusion portion 327 and the contact 3 (G) is allowed up to a gap of about 0.05 mm to 0.1 mm. Further, the dielectric constant of the conductive resin may be 10 S/m to 200 S/m, which is the same level as the antistatic resin, and 30 S/m to 150 S/m is more suitable.

Further, in the above embodiment, the internal conductors 21 of the Twinax cable 2 are soldered to the first electrodes 4 for signal of the paddle card substrate 41, and the external conductor 23 of the Twinax cable 2 is soldered to the first electrode 5 for ground of the paddle card substrate 41, but the internal conductors 21 and the first electrodes 4 for signal, and the external conductor 23 and the first electrode 5 for ground may be electrically connected by means other than soldering, for example, welding or caulking.

Further, in the above embodiment, the portions surrounded by the solder resists 110 and 120 are not necessary to be only the portion of the electrode for ground in contact with the conductor of the cable and the portion of the electrode for signal in contact with the conductor of the cable. At least, it is sufficient that the portion of the electrode for ground in contact with the conductor of the cable and the portion of the electrode for signal in contact with the conductor of the cable are surrounded by the solder resists 110 and 120.

Second Embodiment

Figure 16:
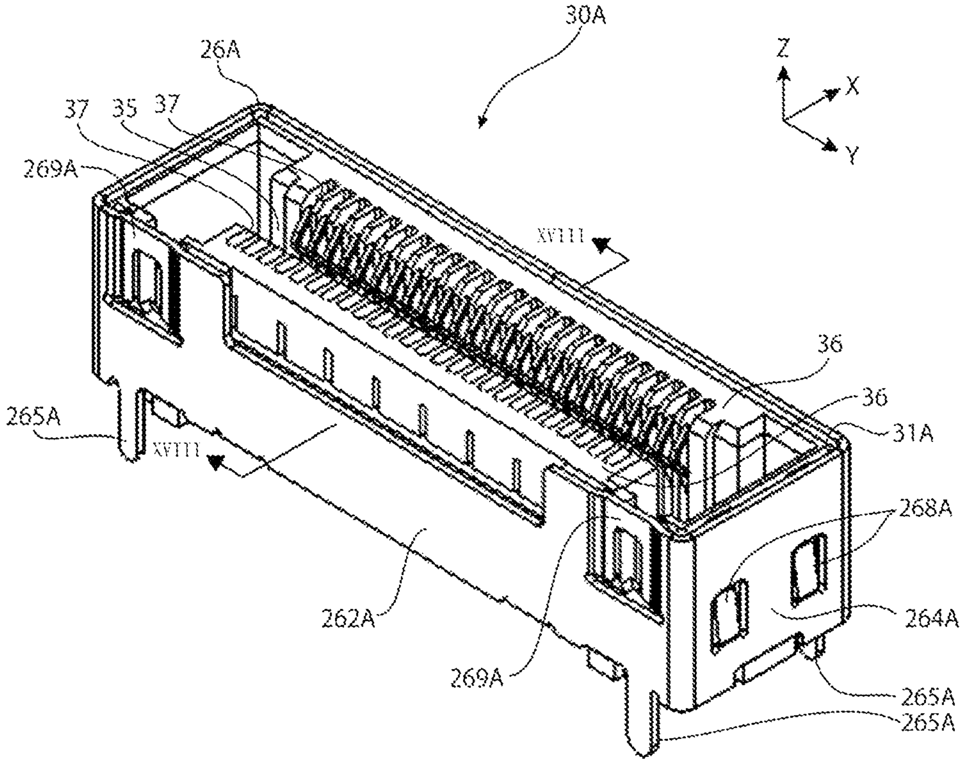
FIG. 16 is a perspective view of a first connector 30A according to the second embodiment of the present disclosure.
Figure 17:
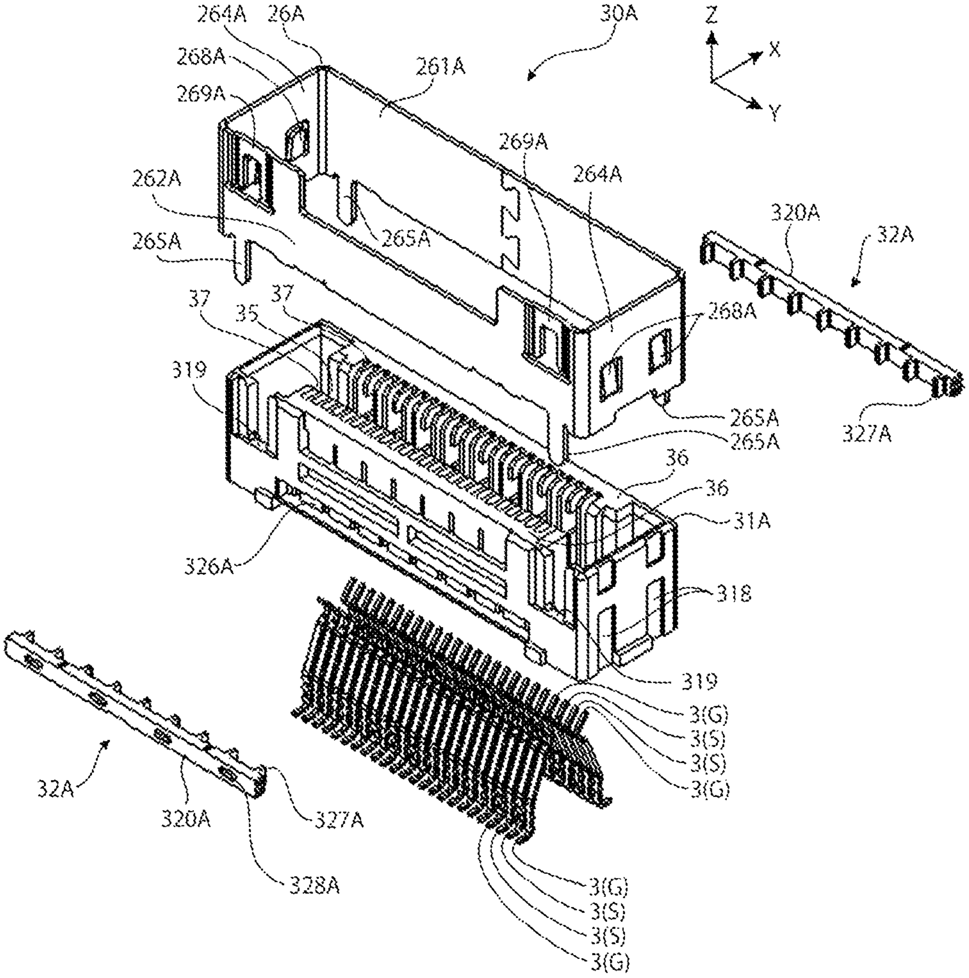
FIG. 17 is an exploded view of FIG. 16.
Figure 18:
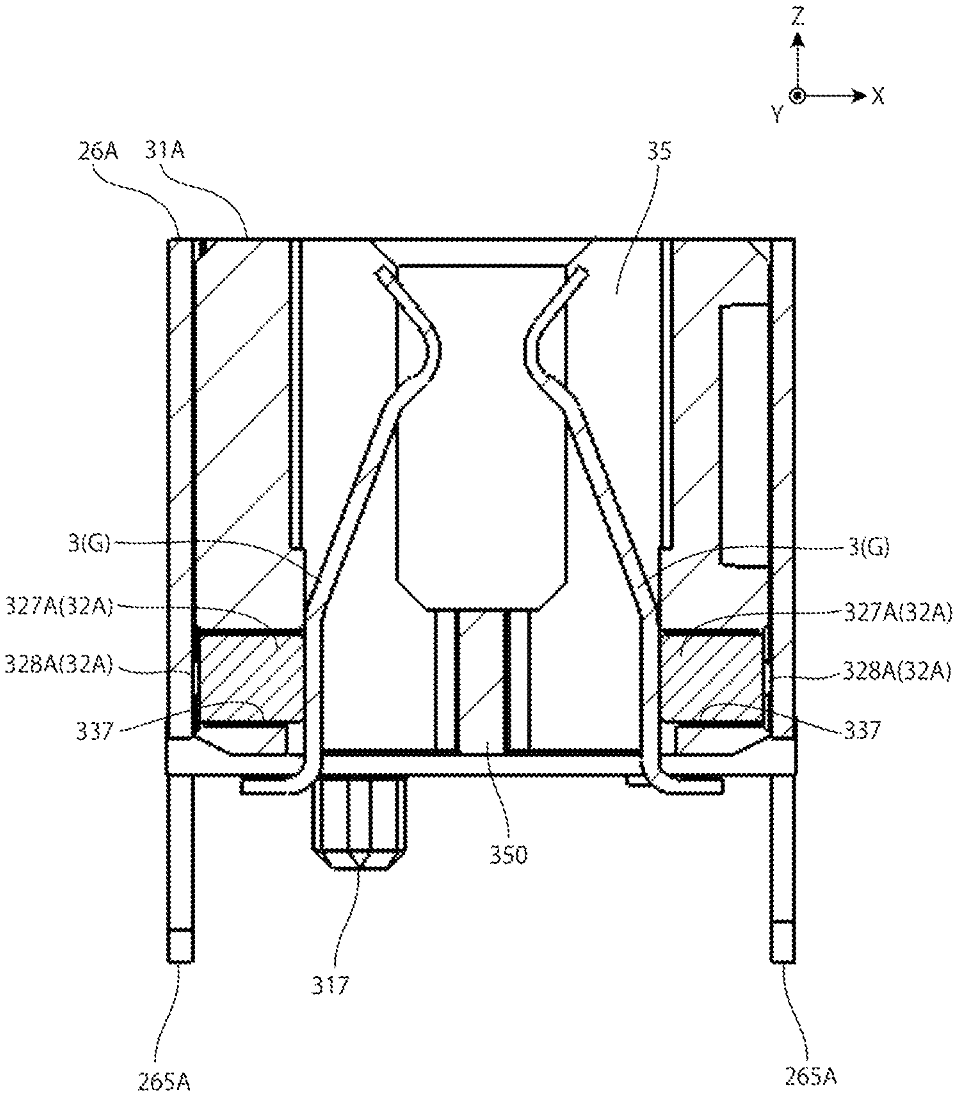
FIG. 18 is a cross-sectional view taken along line XVIII-XVIII of FIG. 16.
Figure 19:
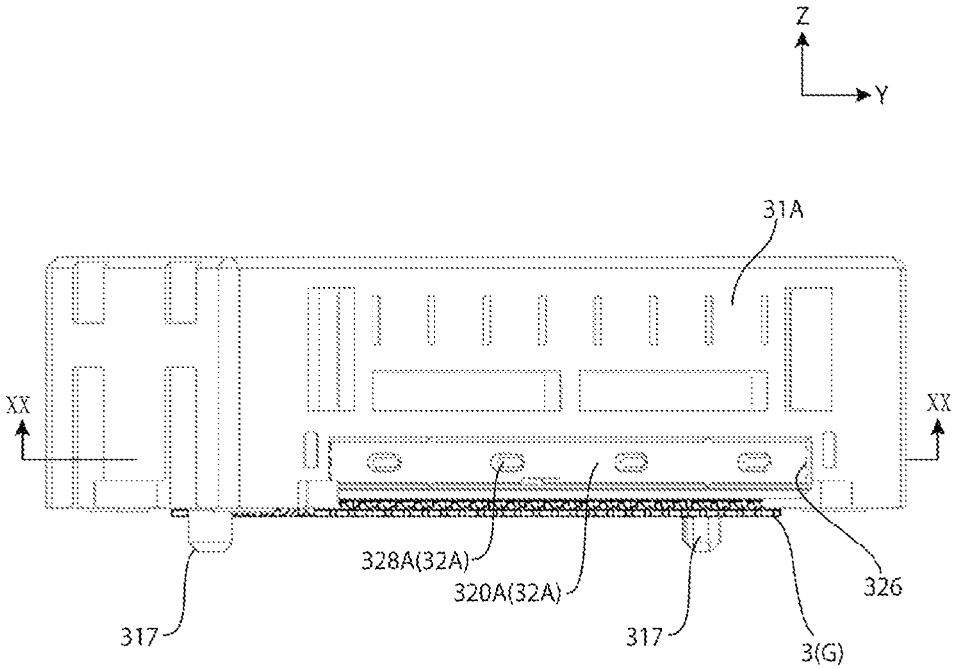
FIG. 19 is a perspective view of FIG. 16 with the metal cover 26A removed as viewed from another direction.
Figure 20:
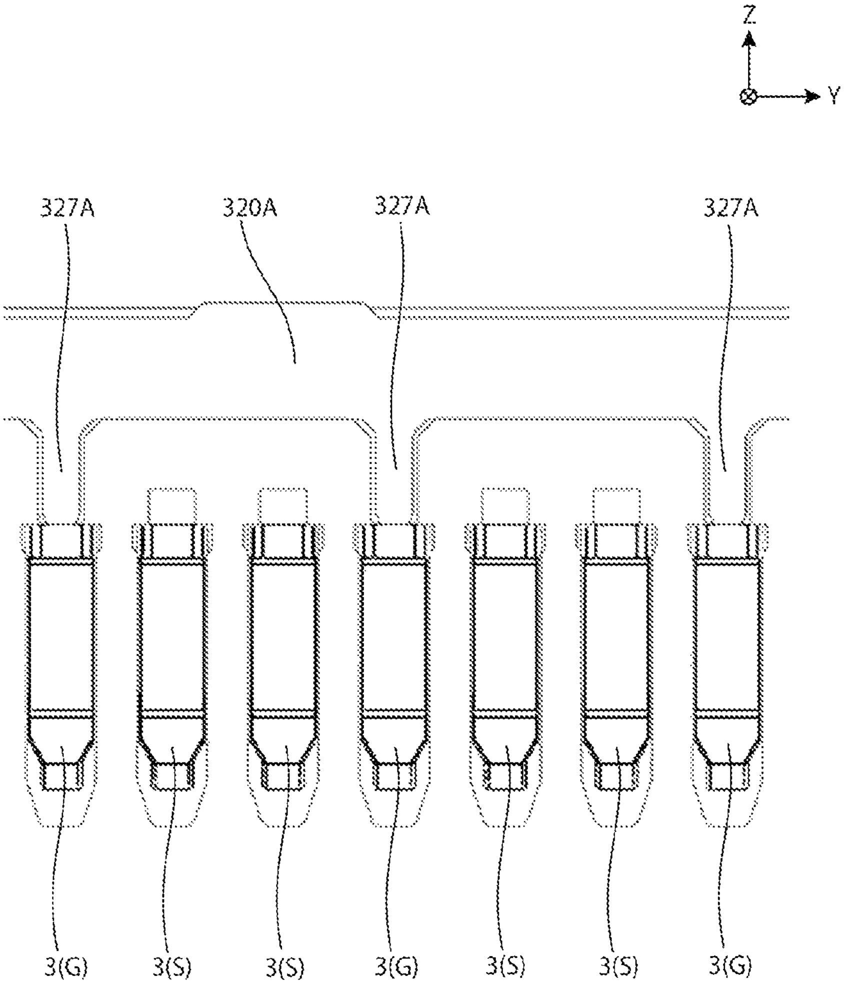
FIG. 20 is a diagram showing a portion of a cross-section taken along line XX-XX of FIG. 19.
Figure 21:
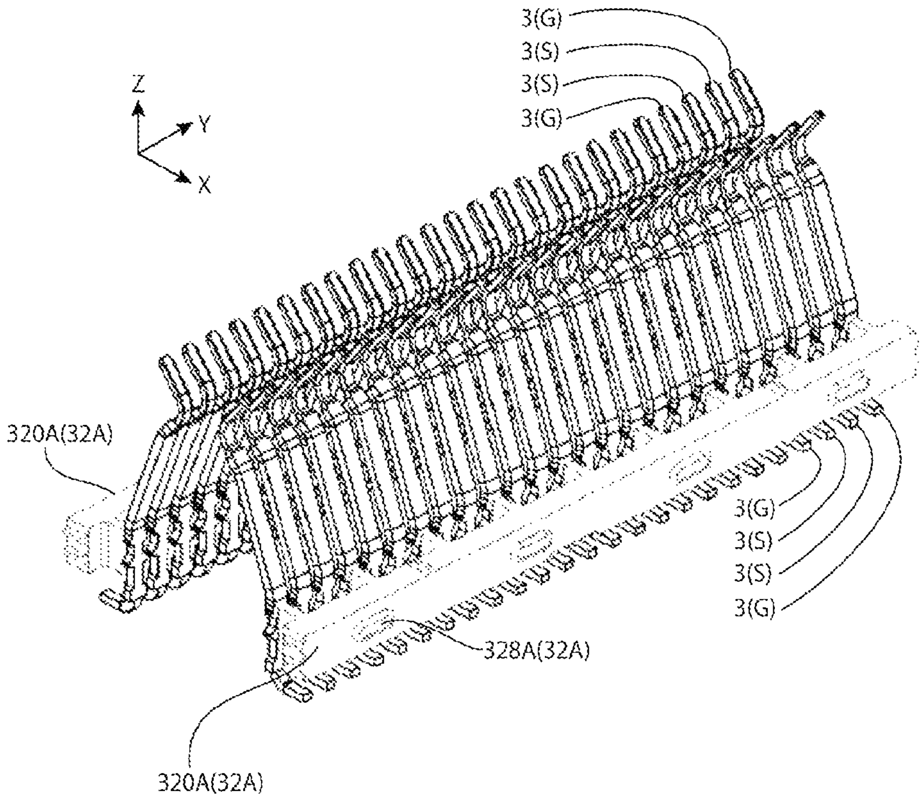
FIG. 21 is a perspective view showing the contacts 3 and the second conductive resins 32A of FIG. 16.

Next, the second embodiment of the present disclosure is described. FIG. 16 is a perspective view of a first connector 30A according to the second embodiment of the present disclosure. FIG. 17 is an exploded view of FIG. 16. FIG. 18 is a cross-sectional view taken along line XVIII-XVIII of FIG. 16. FIG. 19 is a perspective view of FIG. 16 with the metal cover 26A removed as viewed from another direction. FIG. 20 is a diagram showing a portion of a cross-section taken along line XX-XX of FIG. 19. FIG. 21 is a perspective view showing the contacts 3 and the second conductive resins 32A of FIG. 16. In these figures, the same elements as those in the first embodiment are denoted by the same reference numerals, and a further description thereof will be omitted.

As shown in FIG. 16, and FIG. 17, the first connector 30A has a metal cover 26A, a first insulator 31A, contacts 3 (G) and 3 (S), and second conductive resins 32A.

The metal cover 26A is a frame body bent along the outer periphery of the first insulator 31A. The metal cover 26A has a front plate portion 261A and a rear plate portion 262A facing each other in front and rear in parallel, and left and right side plate portions 264A connected to the front plate portion 261A and the rear plate portion 262A. There are projection portions 265A extending downward at the left and right edges of the front plate portion 261A and the rear plate portion 262A. There are engaging portions 268A at respective portions of the left and right side plate portions 264A separated from the centers in front and rear. The base end of the engaging portion 268A is connected to the side plate portion 264A and its upper portion is fallen inward. There are engaging portions 269A at the left and right edges of the rear plate portion 262A. The engaging portion 269A is bent inward.

The first slot 35 of the first insulator 31A is divided into a front space and a rear space by a partition wall 350. There are grooves 318 and 319 for fitting the engaging portions 268A and 269A of the metal cover 26A on the left and right side surfaces and the front and rear side surfaces of the first insulator 31A. Further, the front and rear side surfaces of the first insulator 31A are provided with recess portions 326A for fitting the second conductive resins 32A. The lower surface of the first insulator 31A is provided with positioning protrusions 317.

The second conductive resin 32A is formed by projecting nine protrusion portions 327A from one surface of the approximately rectangular parallelepiped shaped main body portion 320A. Four convex portions 328A are provided on the surface opposite to the side of the protrusion portions 327A of the main body portion 320A.

In a state where the contacts 3 (G) and 3 (S) are pressed into the narrow grooves 37 of the first insulator 31A, and the second conductive resins 32A are fitted into the recess portions 326A, when the metal cover 26A is placed from above the first insulator 31A, the engaging portions 268A and 269A of the metal cover 26A are fitted into the grooves 318 and 319, the inner surface of the metal cover 26A is pressed inward in contact with the convex portions 328A of the second conductive resins 32A, and the metal cover 26A, the first insulator 31A, the contacts 3 (G) and 3 (S), and the second conductive resins 32A are integrated.

Here, in the present embodiment, positioning holes and through holes are provided on both ends of the substrate 20 sandwiching the wiring 203. The positioning protrusions 317 of the first connector 30A are inserted into the positioning holes of the substrate 20. The projection portions 265A of the metal cover 26A are inserted into the through holes of the substrate 20 and soldered.

As shown in FIG. 18, the protrusion portions 327A of the second conductive resins 32A pass through the slits 337 inside the recess portions 326A of the first insulator 31A and come into contact with the contacts 3 (G)

The details of the present embodiment are explained above. The same effect as that of the above first embodiment is also obtained according to the present embodiment.

Third Embodiment

Figure 22:
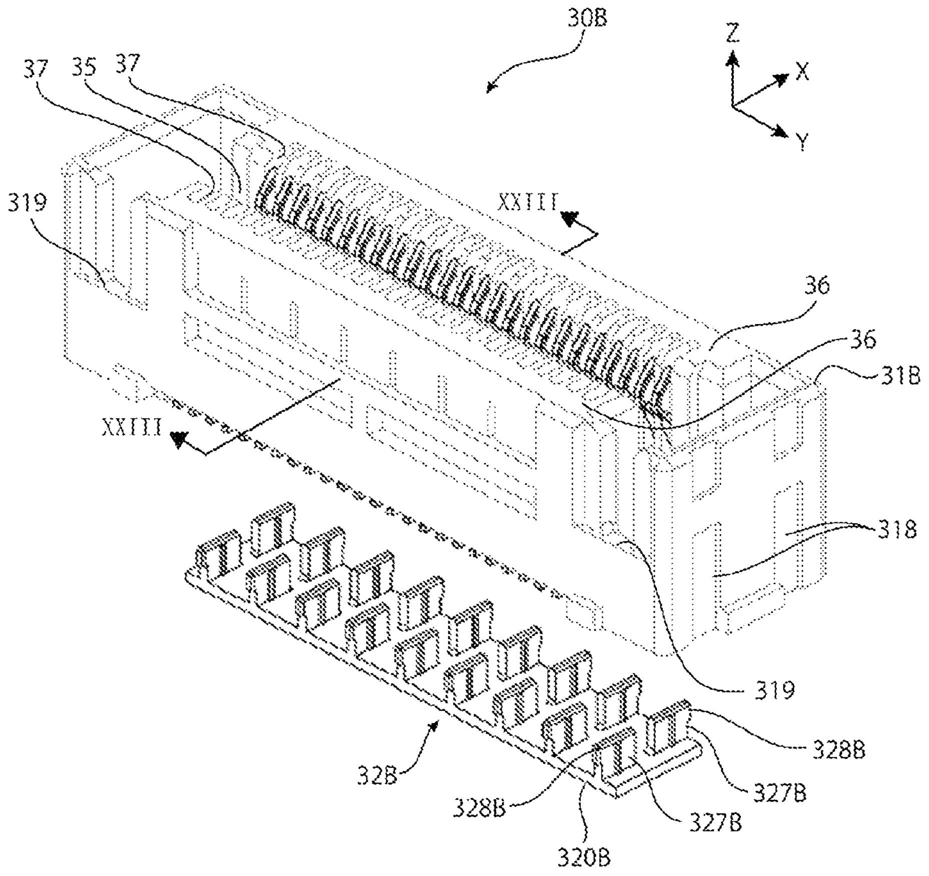
FIG. 22 is a perspective view of a first connector 30B according to the third embodiment of the present disclosure with the metal cover 26A removed.
Figure 23:
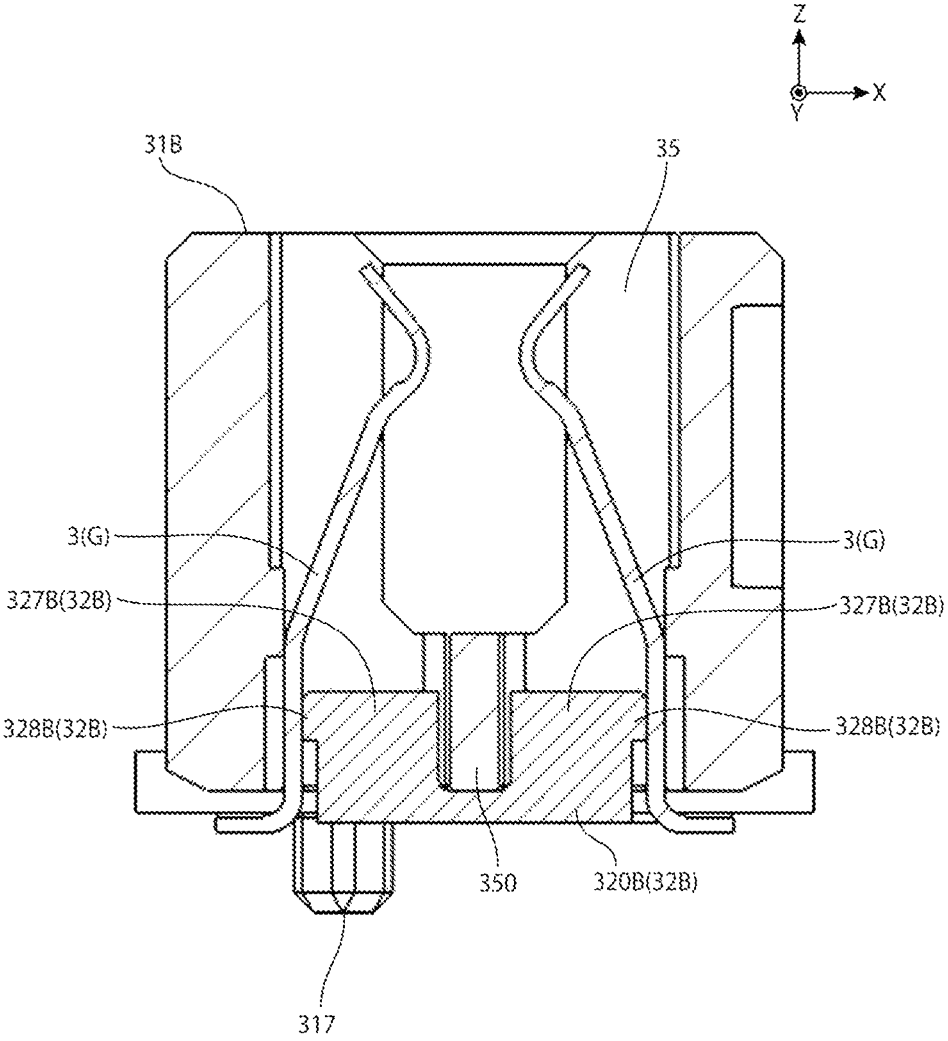
FIG. 23 is a cross-sectional view taken along line XXIII-XXIII of FIG. 22.

Next, the third embodiment of the present disclosure is described. FIG. 22 is a perspective view of a first connector 30B according to the third embodiment of the present disclosure with the metal cover 26A removed. FIG. 23 is a cross-sectional view taken along line XXIII-XXIII of FIG. 22. In these figures, the same elements as those in the first and second embodiments are denoted by the same reference numerals, and a further description thereof will be omitted.

In the present embodiment, the first insulator 31A and the second conductive resins 32A of the second embodiment are replaced with a first insulator 31B and a second conductive resin 32B.

The second conductive resin 32B is formed by projecting a plurality of protrusion portions 327B arranged side by side in two rows from one surface of the thin plate portion 320B extending in left and right. The number of the protrusion portions 327B forming one row on the thin plate portion 320B is nine. The interval between two rows of the protrusion portions 327A on the thin plate portion 320B is slightly larger than the width of the partition wall 350 of the first insulator 31B. The upper portion of the side surface of the protrusion portion 327B projects outward as a convex portion 328B.

The front and rear side surfaces of the first insulator 31B are not provided with recess portions for fitting the second conductive resin 32B. The second conductive resin 32B is fitted into the first slot 35 from the lower side of the first slot 35 of the first insulator 31B.

As shown in FIG. 23, the convex portions 328B of the second conductive resin 32B are in contact with the inner surfaces of the contacts 3 (G).

The details of the present embodiment are explained above. The same effect as that of the above first and second embodiments is also obtained according to the present embodiment.

Fourth Embodiment

Figure 24:
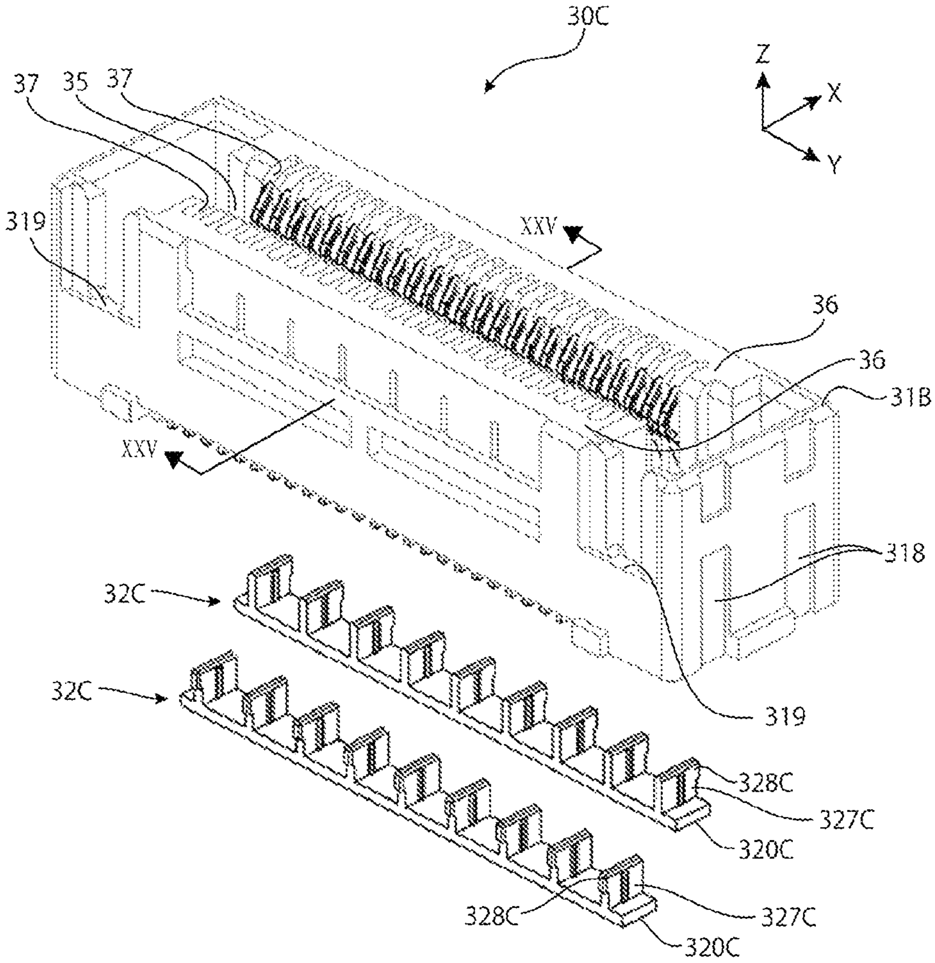
FIG. 24 is a perspective view of a first connector 30C according to the fourth embodiment of the present disclosure with the metal cover 26A removed.
Figure 25:
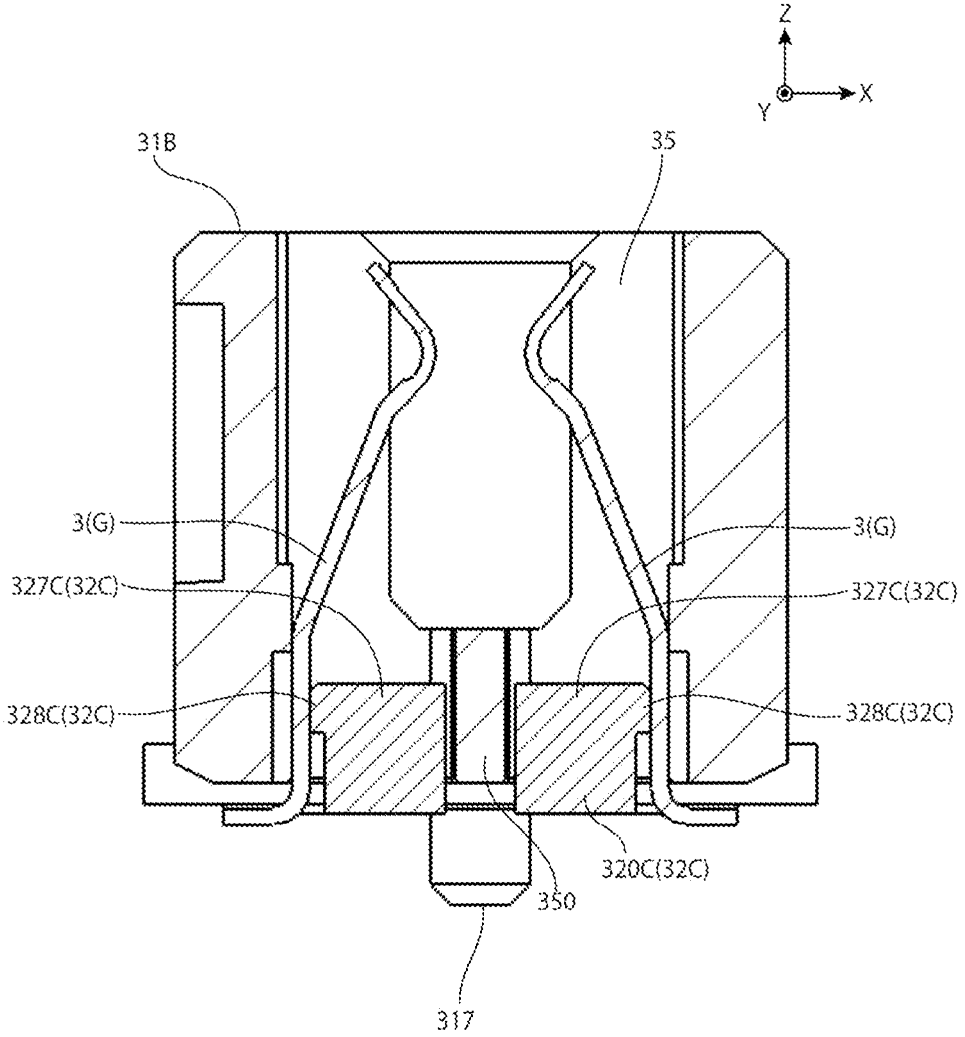
FIG. 25 is a cross-sectional view taken along line XXV-XXV of FIG. 24.

Next, the fourth embodiment of the present embodiment is described. FIG. 24 is a perspective view of a first connector 30C according to the fourth embodiment of the present disclosure with the metal cover 26A removed. FIG. 25 is a cross-sectional view taken along line XXV-XXV of FIG. 24. In these figures, the same elements as those in the first to third embodiments are denoted by the same reference numerals, and a further description thereof will be omitted.

In the present embodiment, the second conductive resin 32B of the third embodiment is replaced with second conductive resins 32C divided into two.

The second conductive resin 32C is formed by projecting protrusion portions 327C arranged side by side in one row from one surface of the thin plate portion 320C extending in left and right. The upper portion of the side surface of the protrusion portion 327C projects outward as a convex portion 328C.

Two second conductive resins 32C are fitted into the first slot 35 from the lower side of the first slot 35 of the first insulator 31B.

As shown in FIG. 25, the convex portions 328C of the second conductive resins 32C are in contact with the inner surfaces of the contacts 3 (G).

The details of the present embodiment are explained above. The same effect as that of the above first to third embodiments is also obtained according to the present embodiment.

Fifth Embodiment

Figure 26:
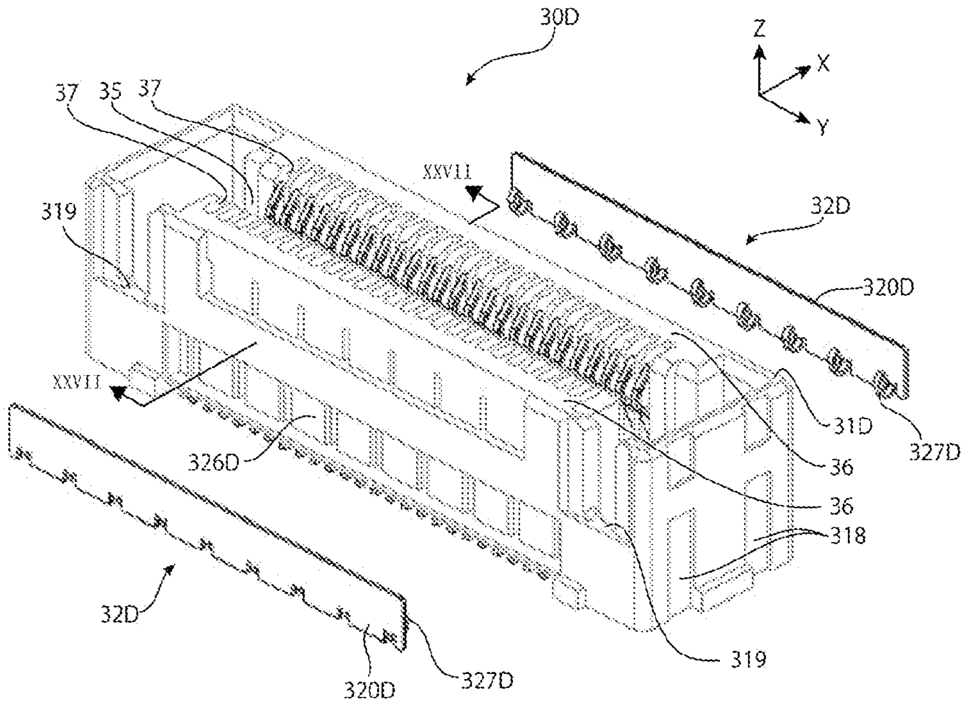
FIG. 26 is a perspective view of a first connector 30D according to the fifth embodiment of the present disclosure with the metal cover 26A removed.
Figure 27:
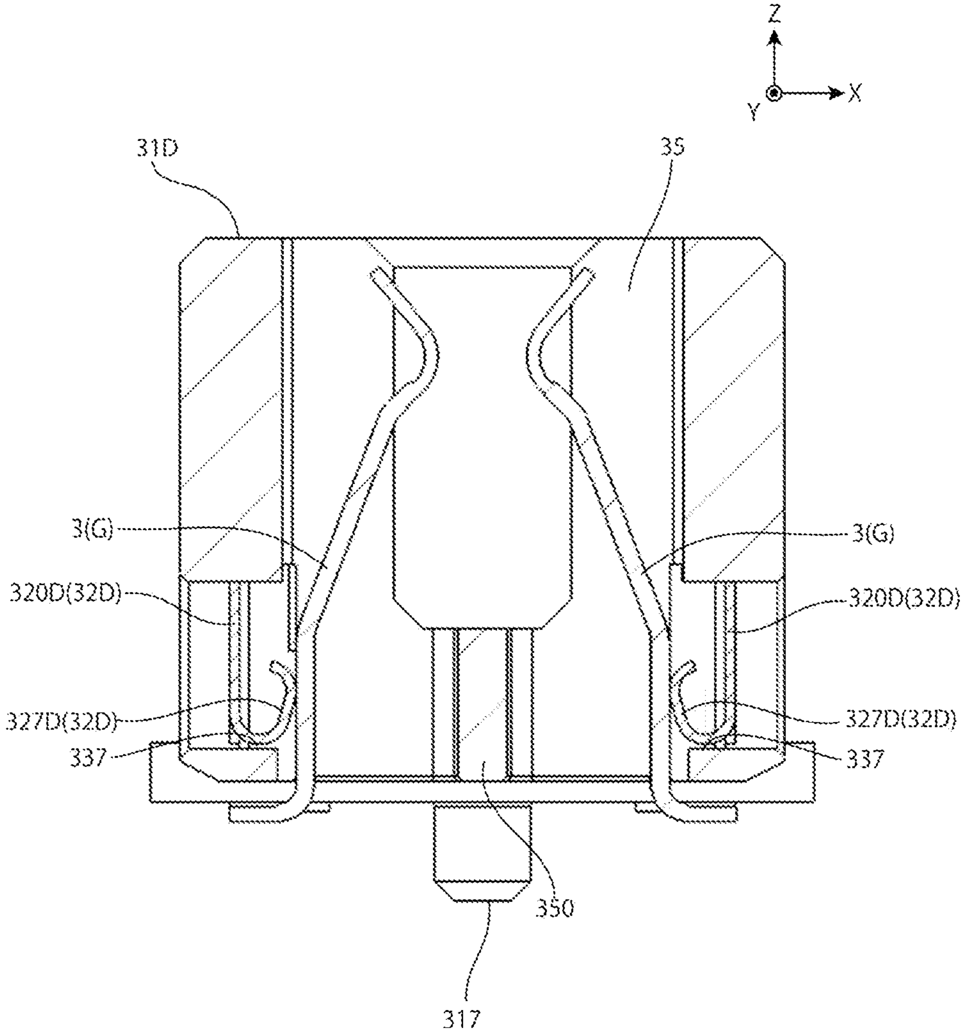
FIG. 27 is a cross-sectional view taken along line XXVII-XXVII of FIG. 26.

Next, the fifth embodiment of the present disclosure is described. FIG. 26 is a perspective view of a first connector 30D according to the fifth embodiment of the present disclosure with the metal cover 26A removed. FIG. 27 is a cross-sectional view taken along line XXVII-XXVII of FIG. 26. In these figures, the same elements as those in the first to fourth embodiments are denoted by the same reference numerals, and a further description thereof will be omitted.

In the present embodiment, the first insulator 31A and the second conductive resins 32A of the second embodiment are replaced with a first insulator 31D and metal members 32D.

The front and rear side surfaces of the first insulator 31D are provided with recess portions 326D for fitting the metal members 32D.

The metal member 32D is formed by projecting protrusion portions 327D from the lower end side of the metal plate 320D extending in left and right. The protrusion portion 327D is bent into a hook-shape.

As shown in FIG. 27, the protrusion portions 327D of the metal members 32D pass through the slits 337 inside the recess portions 326D of the first insulator 31D and come into contact with the contacts 3 (G).

The details of the present embodiment are explained above. The same effect as that of the above first to fourth embodiments is also obtained according to the present embodiment.

Sixth Embodiment

Figure 28:
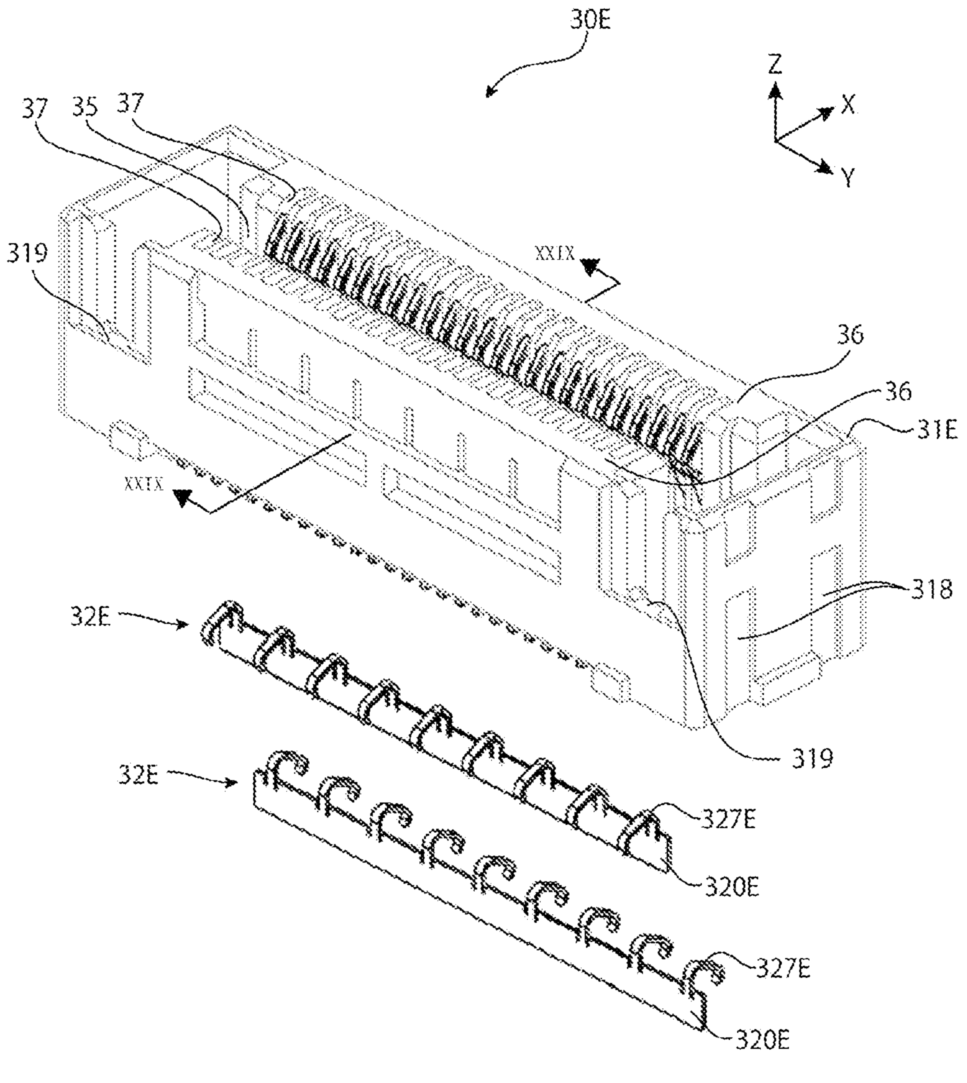
FIG. 28 is a perspective view of a first connector 30E according to the sixth embodiment of the present disclosure with the metal cover 26A removed.
Figure 29:
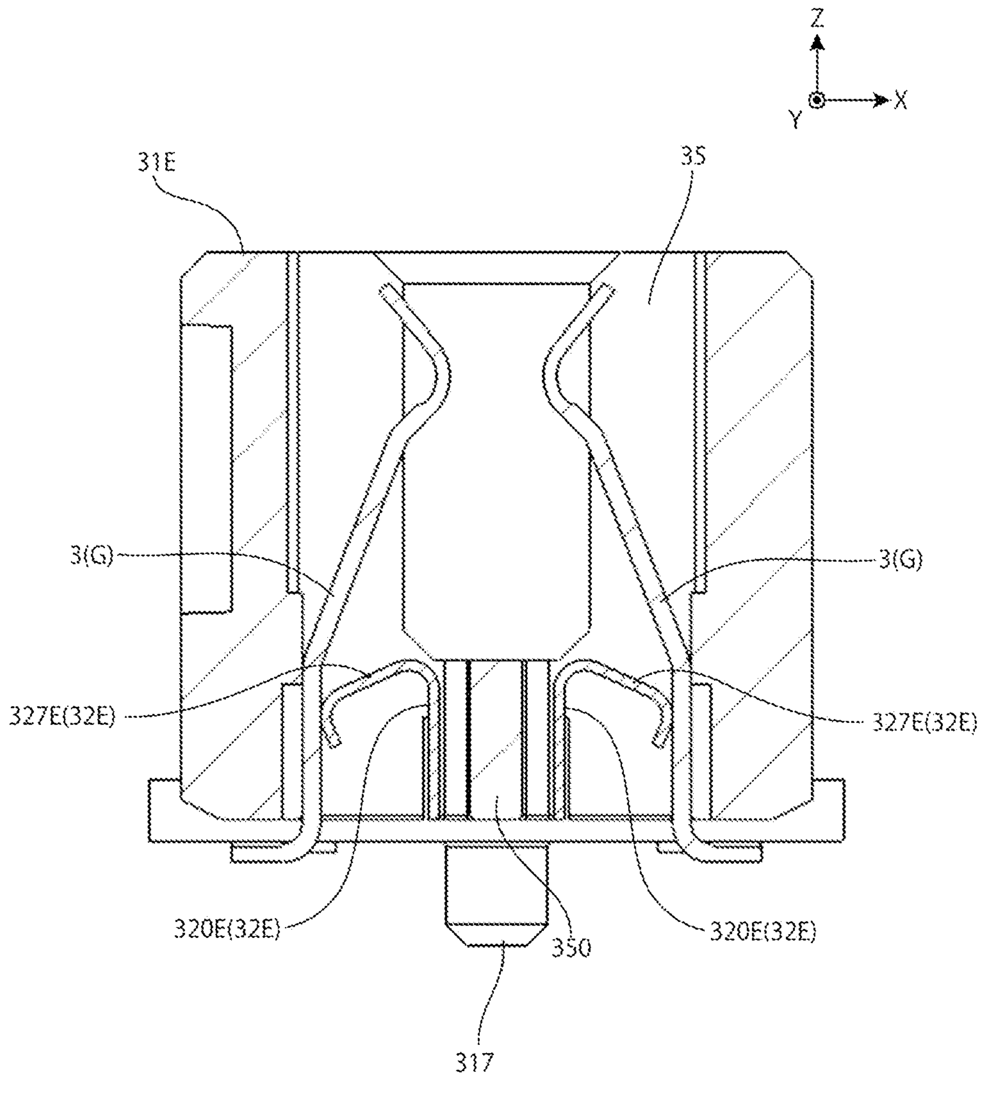
FIG. 29 is a cross-sectional view taken along line XXIX-XXIX of FIG. 28.

Next, the sixth embodiment of the present disclosure is described. FIG. 28 is a perspective view of a first connector 30E according to the sixth embodiment of the present disclosure with the metal cover 26A removed. FIG. 29 is a cross-sectional view taken along line XXIX-XXIX of FIG. 28. In these figures, the same elements as those in the first to fifth embodiments are denoted by the same reference numerals, and a further description thereof will be omitted.

In the present embodiment, the first insulator 31A and the second conductive resins 32A of the second embodiment are replaced with a first insulator 31 E and metal members 32E.

The metal member 32E is formed by projecting protrusion portions 327E from the upper end side of the metal plate 320E extending in the left and right. The protrusion portion 327E is bent into a hook-shape.

The front and rear side surfaces of the first insulator 31E are not provided with recess portions for fitting the metal members 32E. The metal members 32E are fitted into the first slot 35 from the lower side of the first slot 35 of the first insulator 31E.

As shown in FIG. 29, the metal members 32E are in contact with the inner surfaces of the contacts 3 (G).

The details of the present embodiment are explained above. The same effect as that of the above first to fifth embodiments is also obtained according to the present embodiment.

Seventh Embodiment

Figure 30:
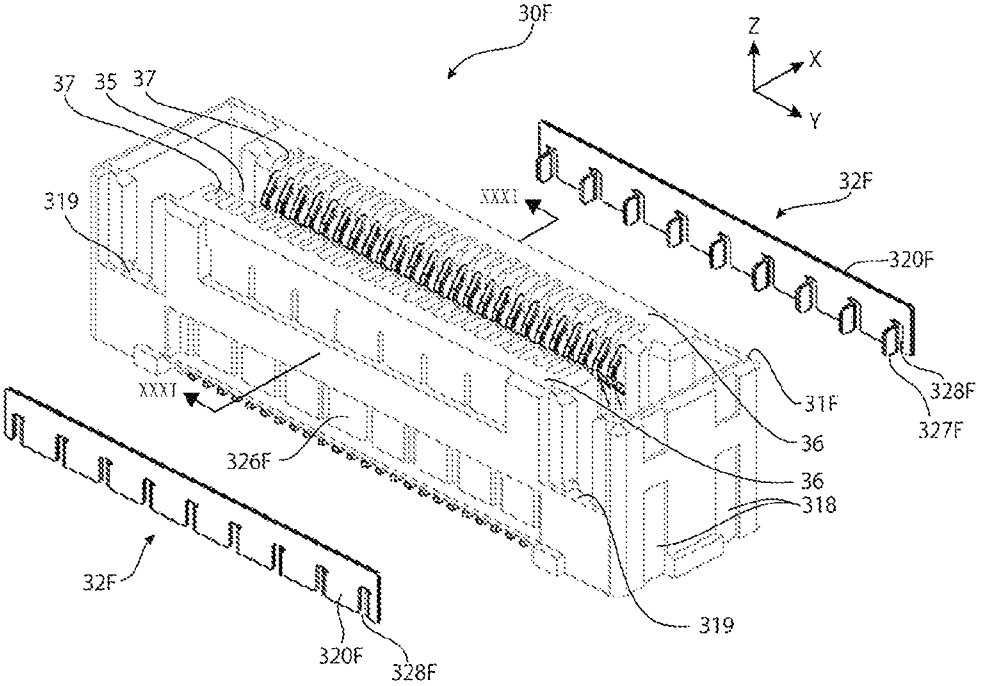
FIG. 30 is a perspective view of a first connector 30F according to the seventh embodiment of the present disclosure with the metal cover 26A removed.
Figure 31:
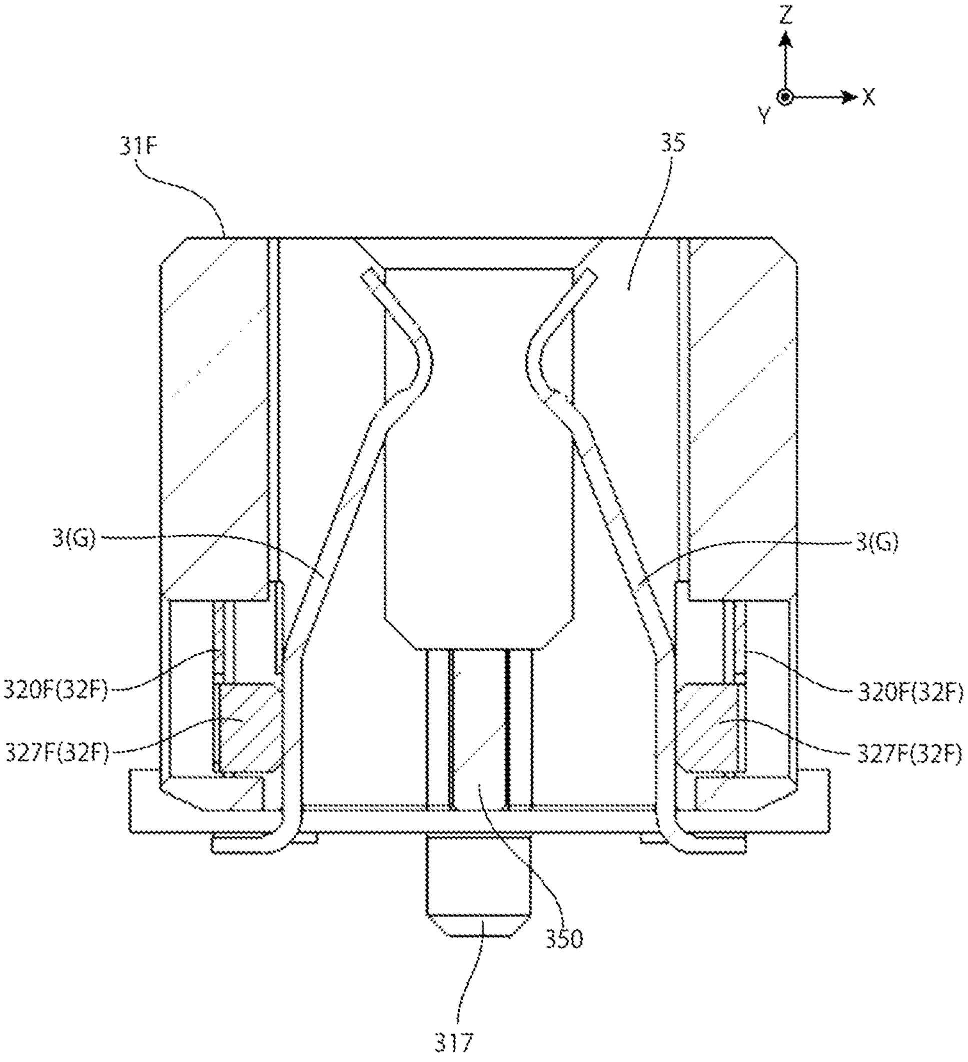
FIG. 31 is a cross-sectional view taken along line XXXI-XXXI of FIG. 30.

Next, the seventh embodiment of the present disclosure is described. FIG. 30 is a perspective view of a first connector 30F according to the seventh embodiment of the present disclosure with the metal cover 26A removed. FIG. 31 is a cross-sectional view taken along line XXXI-XXXI of FIG. 30. In these figures, the same elements as those in the first to sixth embodiments are denoted by the same reference numerals, and a further description thereof will be omitted.

In the present embodiment, the first insulator 31A and the second conductive resins 32A of the second embodiment are replaced with a first insulator 31 F and metal members 32F.

The front and rear side surfaces of the first insulator 31F are provided with recess portions 326F for fitting the metal members 32F.

The metal member 32F is formed by erecting protrusion portions 327F from one surface of the metal plate 320F extending in left and right. A notch 328F is provided on the +Y side of the base end of the protrusion portion 327F of the metal plate 320F.

As shown in FIG. 31, the protrusion portions 327F of the metal members 32F pass through the slits 337 inside the recess portions 326F of the first insulator 31F and come into contact with the contacts 3 (G).

The details of the present embodiment are explained above. The same effect as that of the above first to sixth embodiments is also obtained according to the present embodiment.

Eighth Embodiment

Figure 32:
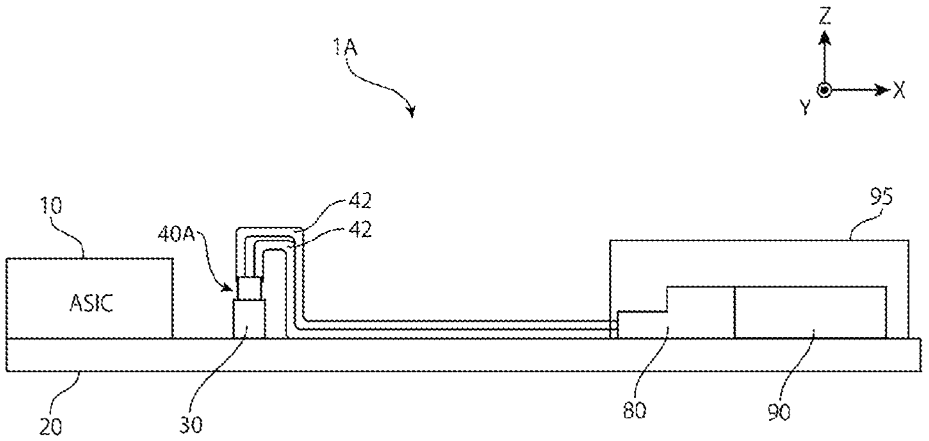
FIG. 32 is a side view of a high-speed transmission device 1A including an ASIC 10, a first connector 30, a cable assembly 40A, and a second connector 80 according to the eighth embodiment of the present disclosure.
Figure 33:
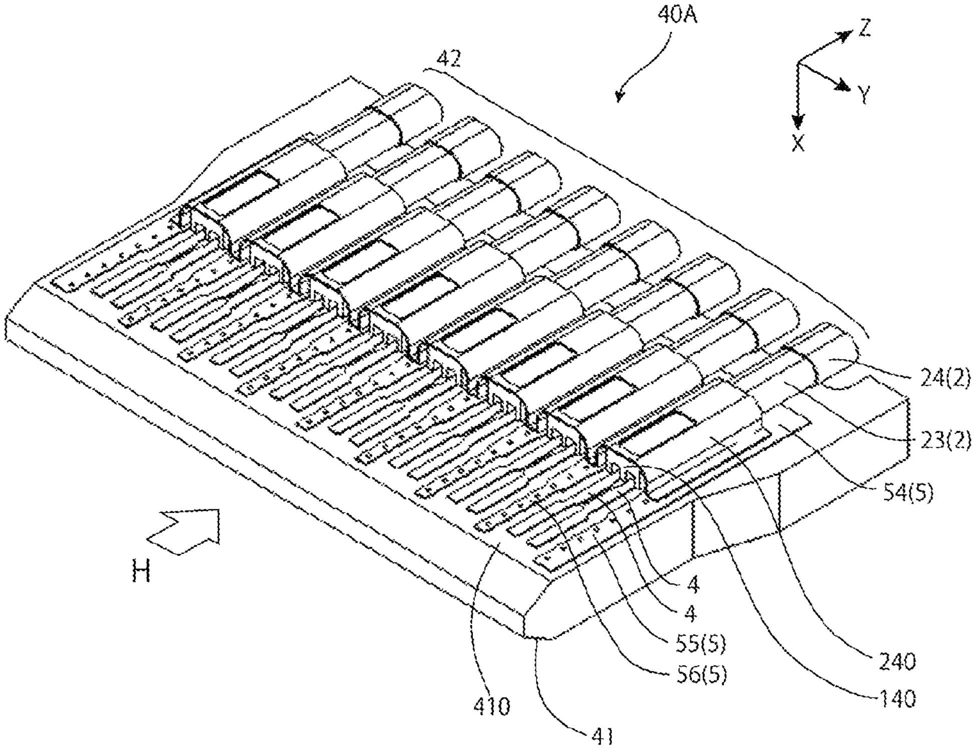
FIG. 33 is a perspective view of the cable assembly 40A of FIG. 32.
Figure 34:
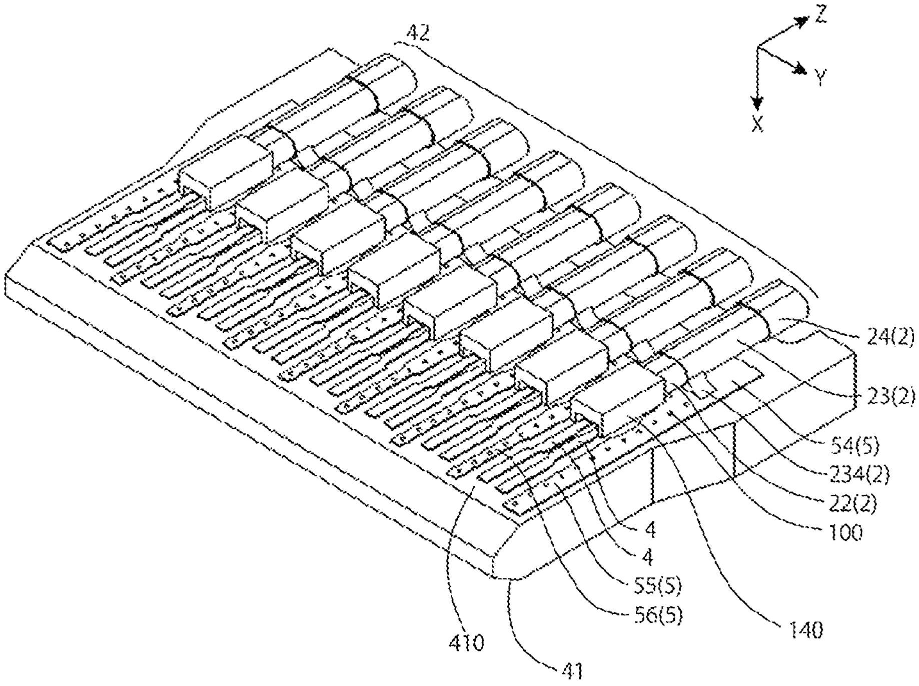
FIG. 34 is a perspective view of the cable assembly 40A of FIG. 33 with the ground cover 240 removed.
Figure 35:
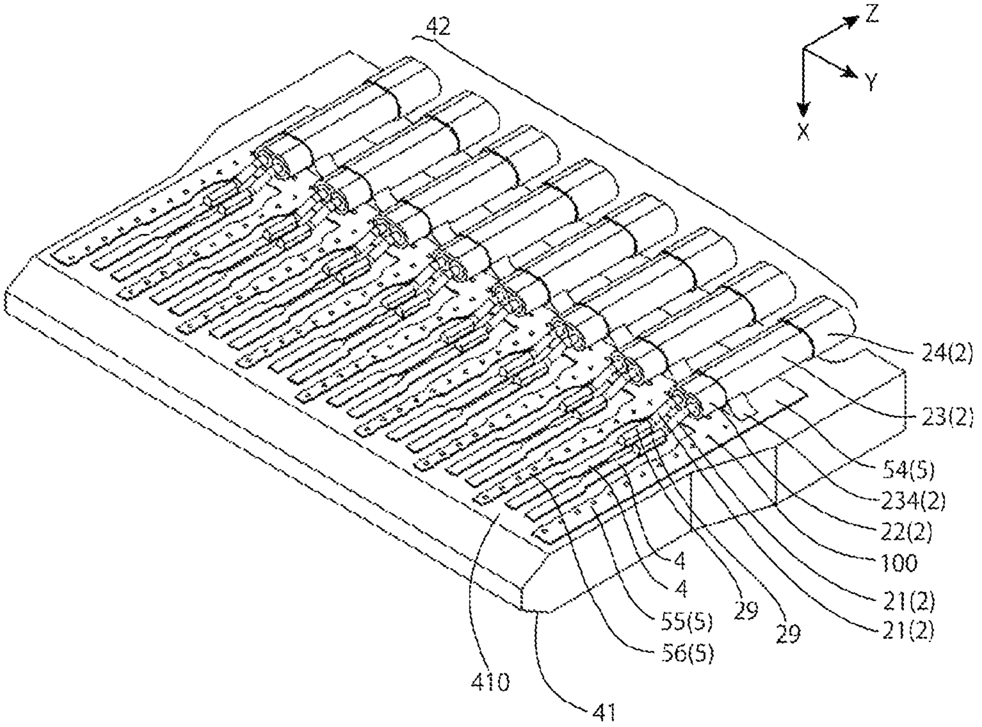
FIG. 35 is a perspective view of the cable assembly 40A of FIG. 34 with the plastic members 140 removed.
Figure 36:
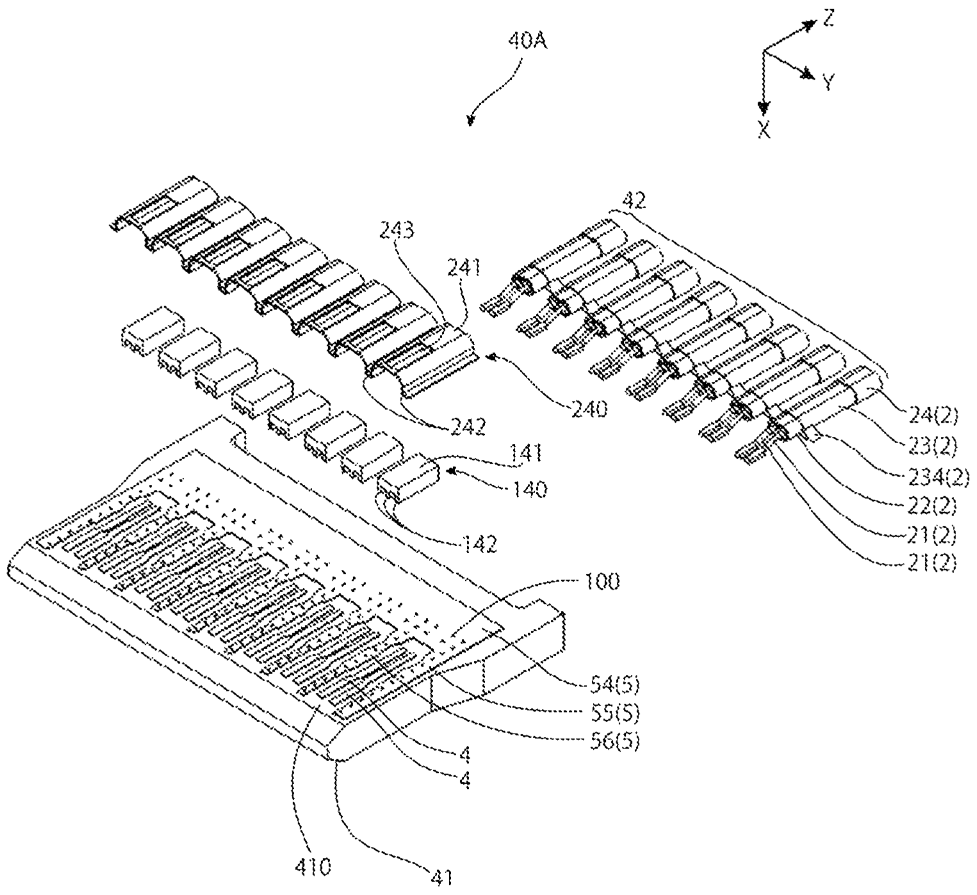
FIG. 36 is an exploded view of FIG. 33.
Figure 37:
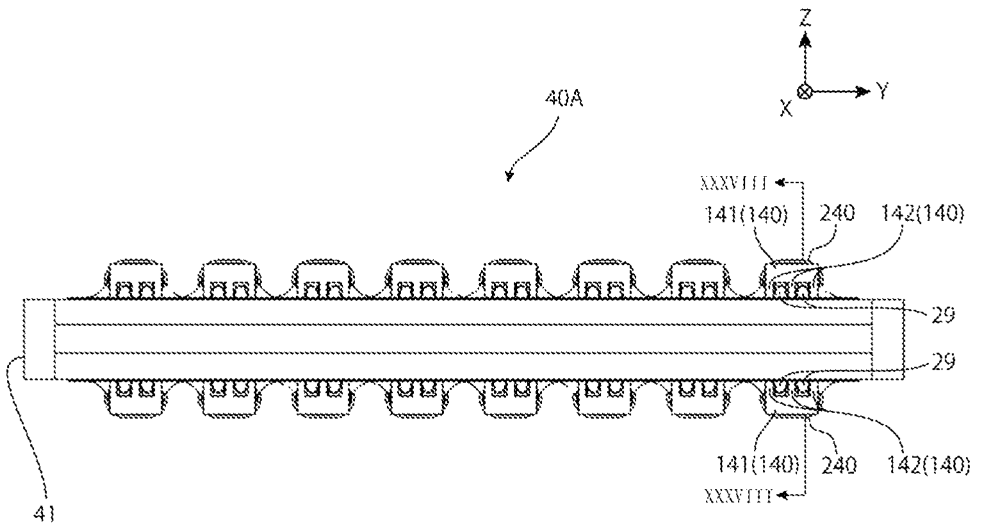
FIG. 37 is a diagram of FIG. 33 as viewed from an H direction.
Figure 38:
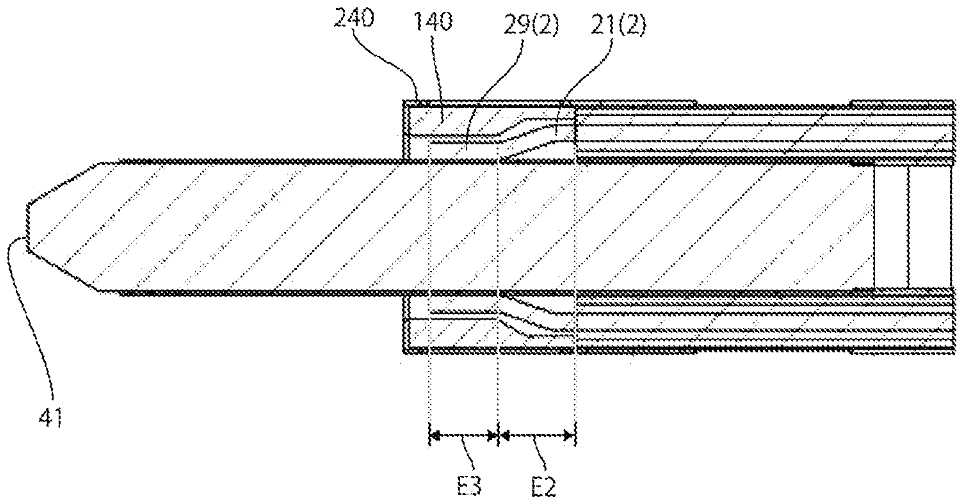
FIG. 38 is a diagram showing a portion of a cross-section taken along line XXXVIII-XXXVIII of FIG. 37.

Next, the eighth embodiment of the present disclosure is described. FIG. 32 is a side view of the high-speed transmission device 1A including an ASIC 10, a first connector 30, a cable assembly 40A, and a second connector 80 according to the eighth embodiment of the present disclosure. FIG. 33 is the perspective view of the cable assembly 40A of FIG. 32. FIG. 34 is a perspective view of the cable assembly 40A of FIG. 33 with the ground cover 240 removed. FIG. 35 is a perspective view of the cable assembly 40A of FIG. 34 with the plastic members 140 removed. FIG. 36 is an exploded view of FIG. 33. FIG. 37 is a diagram of FIG. 33 as viewed from an H direction. FIG. 38 is a diagram showing a portion of a cross-section taken along line XXXVIII-XXXVIII of FIG. 37. In these figures, the same elements as those in the first to seventh embodiments are denoted by the same reference numerals, and a further description thereof will be omitted.

In the present embodiment, the cable assembly 40 of the first embodiment is replaced with a cable assembly 40A.

As shown in FIG. 33, the cable assembly 40A has a cable row 42 in which eight Twinax cables 2 are arranged side by side in left and right, a paddle card substrate 41, plastic members 140, and ground covers 240.

As shown in FIG. 35, a portion of the exposed portion of the external conductor 23 of the Twinax cable 2 is pulled out to the side of the paddle card substrate 41 as a substrate side contact portion 234, and this substrate side contact portion 234 is soldered to an upper portion of the base portion 54 of the first electrode 5 for ground of the paddle card substrate 41. Further, the projecting portions of the internal conductors 21 of the Twinax cable 2 are soldered to the upper edge portions of the first electrodes 4 for signal of the paddle card substrate 41.

As shown in FIG. 34 and FIG. 36, the plastic member 140 has a rectangular parallelepiped shaped main body portion 141, end sides on the +Y side and −Y side of the main body portion 141, and three partition walls 142 projecting from the middle thereof. The plastic member 140 is formed of an insulating resin.

The plastic member 140 corresponds to a pair of internal conductors 21 transmitting a differential signal of one channel in the Twinax cable 2. The plastic member 140 is fixed to the paddle card substrate 41 so as to cover the internal conductors 21 of the Twinax cable 2 and the solder joining portions 29 of the first electrodes 4 for signal of the paddle card substrate 41.

As shown in FIG. 37, the plastic member 140 has an E shape as viewed from the X direction. In a state where the plastic member 140 is fixed to the paddle card substrate 41, the solder joining portion 29 on the left side is settled between the partition wall 142 in the middle and the partition wall 142 on the left side of the plastic member 140, and the solder joining portion 29 on the right side is settled between the partition wall 142 in the middle and the partition wall 142 on the right side of plastic member 140. As shown in FIG. 38, the plastic member 140 is not in contact with the solder joining portion 29 and the projecting portion of internal conductor 21, and a slight gap is secured between the plastic member 140, and the solder joining portion 29 and the projecting portion of the internal conductor 21.

As shown in FIG. 33 and FIG. 36, the ground cover 240 is formed by bending a metal plate having a dimension larger in the Z direction than that of the plastic member 140 so as to form the same number of substantially semicircular columnar curved portions 241 as the number of the plastic members 140. The ground cover 240 is fixed to the paddle card substrate 41 so as to cover the plastic members 140 with the curved portions 241. More specifically, the flat plate portion 242 between the adjacent curved portions 241 of the ground cover 240 is soldered to the extension portions 55 and 56 of the first electrode 5 for ground on the paddle card substrate 41. The curved portion 241 of the plastic member 140 is provided with a rectangular opening 243. In a state where the ground cover 240 is soldered to the extension portions 55 and 56 of the paddle card substrate 41, the plastic member 140 is exposed to the outside through the opening 243 of the curved portion 241.

The details of the configuration of the present embodiment are explained above. The same effect as that of the above first to seventh embodiments is also obtained according to the present embodiment. In addition to this, in the present embodiment, the exposed portions of the internal conductors 21 of the Twinax cable 2 of the paddle card substrate 41 and the joining portions of the first electrodes 4 for signal of the paddle card substrate 41 are covered by the plastic member 140. Thus, the rise of the impedance of the air layer which is not soldered in the internal conductor 21 of the Twinax cable 2 is suppressed, and a better signal transmission characteristic can be realized.

Figure 39:
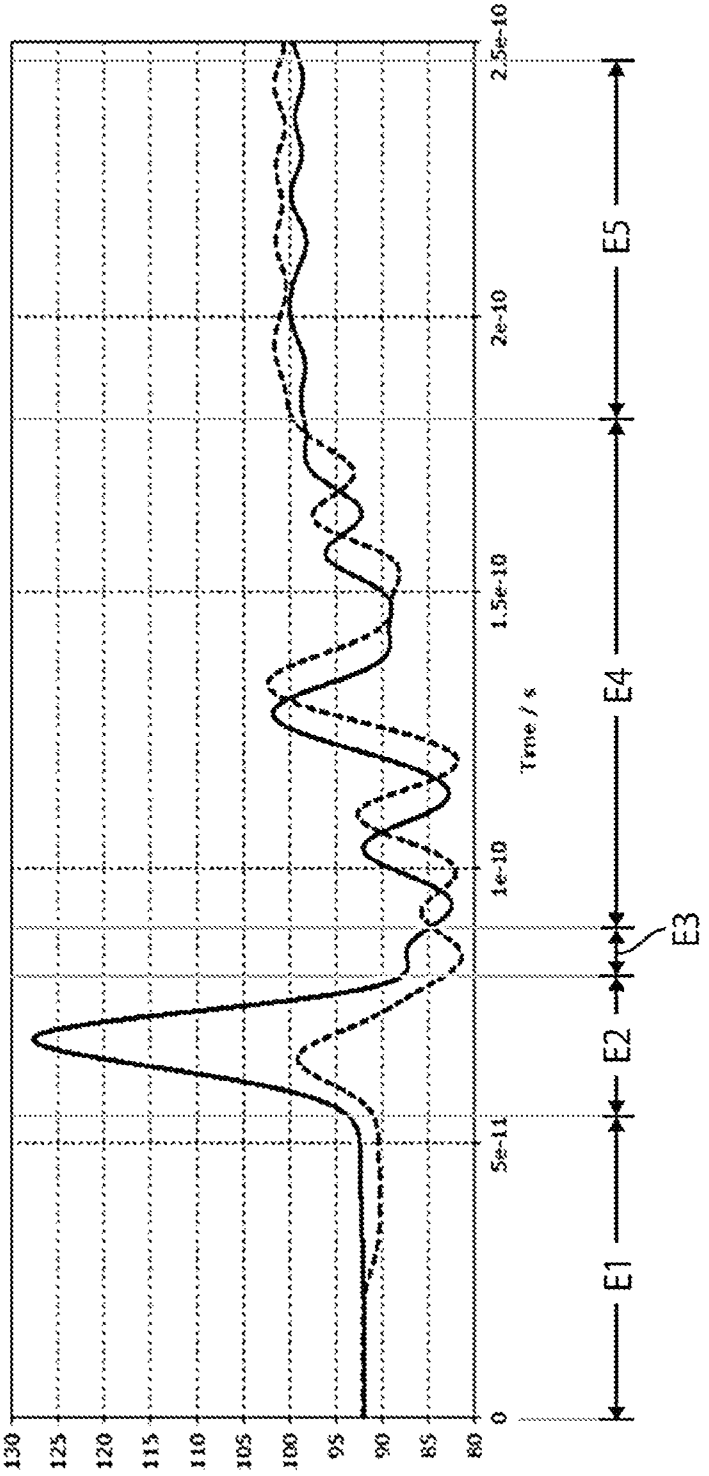
FIG. 39 is a diagram showing an impedance waveform of the cable assembly 40A without the ground cover 240, and an impedance waveform of the cable assembly 40A without the ground cover 240 and the plastic members 140.

Here, the inventor of the present application performed the following verification to confirm the effect of the present disclosure. First, the inventor of the present application calculated, by a TDR (Time Domain Reflectometry) simulator, a TDR waveform in which the cable assembly 40A without the ground cover 240 and the plastic members 140 is used as a DUT (Device Under Test), and a TDR waveform in which the cable assembly 40A without the ground cover 240 is used as a DUT, respectively. FIG. 39 is a diagram showing this simulation result. In FIG. 39, the solid line is the TDR waveform of the cable assembly 40A without the ground cover 240 and the plastic members 140, and the broken line is the TDR waveform of the cable assembly 40A without the ground cover 240. In the waveform, the section E1 corresponds to the propagation time of the signal in the Twinax cable 2, the section E2 corresponds to the propagation time of the signal of the exposed portion of the internal conductor 21 of the Twinax cable 2, the section E3 corresponds to the propagation time of the signal of the solder joining portion 29, the section E4 corresponds to the propagation time of the signal of the first connector 30, and the section E5 corresponds to the propagation time of the signal of the substrate 20.

Referring to FIG. 39, in the TDR waveform of the cable assembly 40A without the ground cover 240 and the plastic members 140, the peak impedance in the section E2 is as high as 128Ω, while in the TDR waveform of the cable assembly 40A without the ground cover 240, the peak impedance in the section E2 is as low as 99Ω. As shown in FIG. 38, in the cable assembly 40A, the exposed portion of the internal conductor 21 of the Twinax cable 2 and the solder joining portion 29 beyond the exposed portion are covered by the plastic member 140, and the air layer around the solder joining portion 29 and the internal conductor 21 is narrower than that without the plastic member 140. The narrowness of this air layer is thought to contribute to the control of the peak impedance in the section E2.

Figure 40:
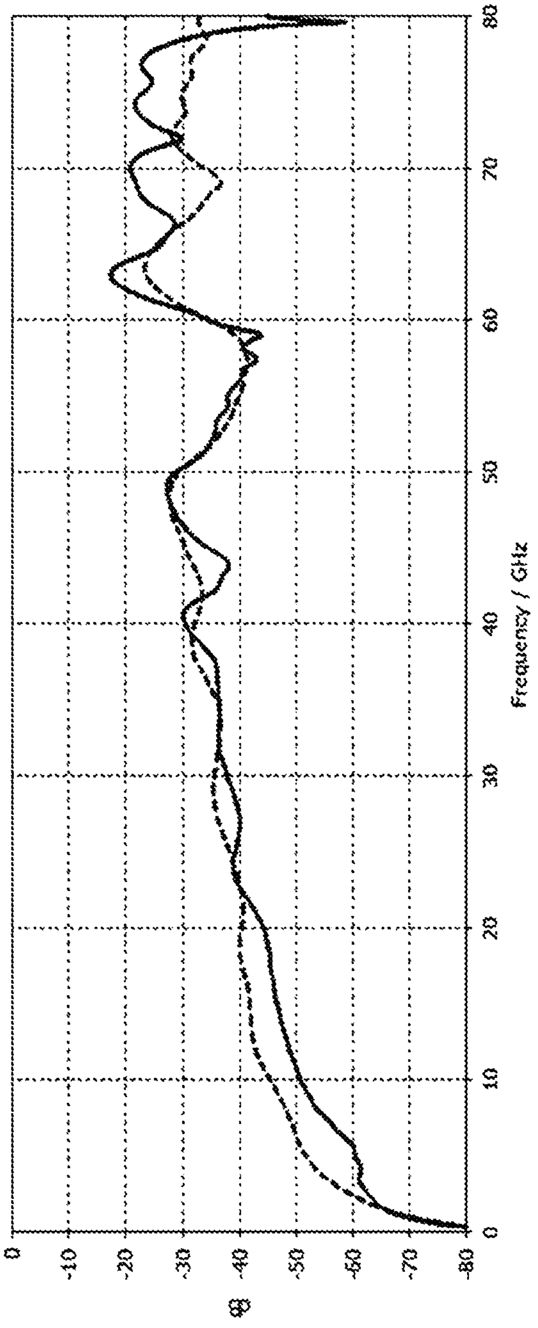
FIG. 40 is a diagram showing respective frequency characteristics of a FEXT of the cable assembly 40A, and a FEXT of the cable assembly 40A without the ground cover 240.

Second, the inventor of the present application calculated respective frequency characteristics of the FEXT of the cable assembly 40A, and the FEXT of the cable assembly 40A without the ground cover 240 by using an electrolysis analysis software. FIG. 40 is a diagram showing this simulation result. In FIG. 40, the solid line is the FEXT of the cable assembly 40A, and the broken line is the FEXT of the cable assembly 40A without the ground cover 240.

Referring to FIG. 40, it can be seen that in the cable assembly 40A of the present embodiment, the FEXT is about 5 to 10 dB smaller than that without the ground cover 240 in the band of 0 to 60 GHz.

Figure 41:
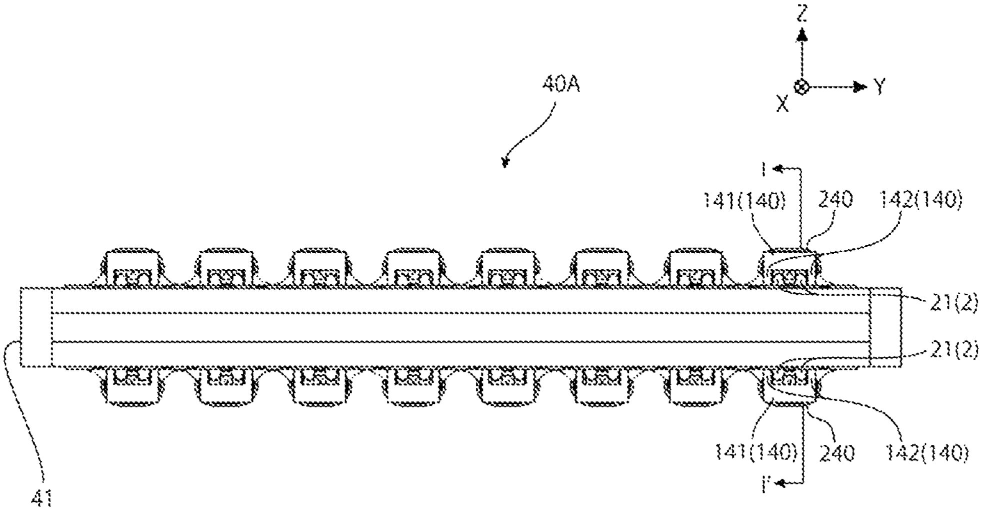
FIG. 41 is a diagram showing a modification example of the cable assembly 40A.

It is to be noted that, in the eighth embodiment, as shown in FIG. 41, a partition wall 142 in the middle of the plastic member 140 may be not provided, and two solder joining portions 29 transmitting the differential signal of one channel in the Twinax cable 2 may be settled between the partition wall 142 on the left side and the partition wall 142 on the right side of the plastic member 140.

Ninth Embodiment

Figure 42:
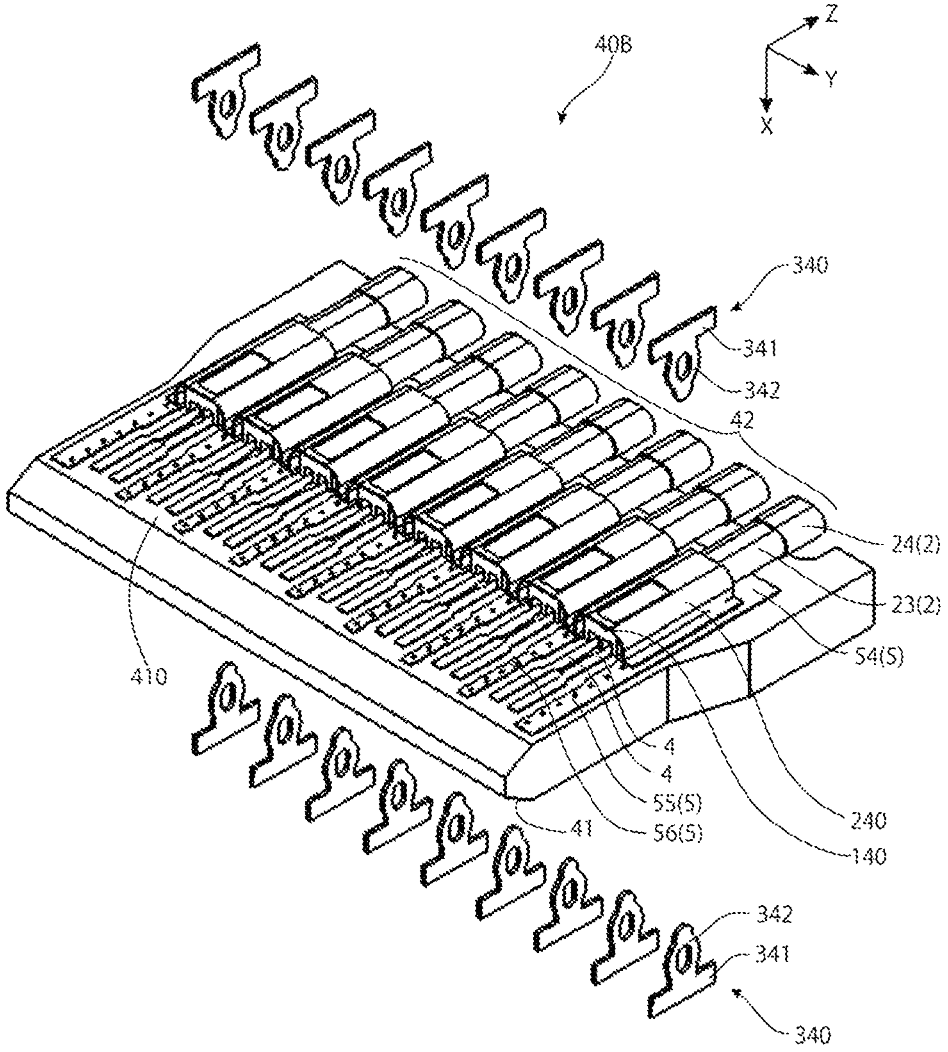
FIG. 42 is a diagram showing a cable assembly 40B according to the ninth embodiment of the present disclosure.

Next, the ninth embodiment of the present disclosure is described. FIG. 42 is a diagram showing a cable assembly 40B according to the ninth embodiment of the present disclosure. In this diagram, the same elements as those in the first to eighth embodiments are denoted by the same reference numerals, and a further description thereof will be omitted.

In the present embodiment, metal terminals 340 are used as means for fixing the ground cover 240 to the paddle card substrate 41. The metal terminal 340 has a long plate portion 341 and an elliptic convex portion 342 connected to one end side of the long plate portion 341. Here, in the present embodiment, holes with a width enough to settle the convex portion 342 of the metal terminal 340 are formed in flat plate portion 242 of the ground cover, and the extension portions 55 and 56 of the first electrode 5 for ground on the paddle card substrate 41. The convex portion 342 of the metal terminal 340 passes through the hole of the flat plate portion 242 of the ground cover 240, and is inserted into and fixed to the holes of the extension portions 55 and 56 of the first electrode 5 for ground at the back of the hole of the flat plate portion 242.

The details of the configuration of the present embodiment are explained above. The same effect as that of the above eighth embodiment is obtained according to the present embodiment.

Tenth Embodiment

Figure 43:
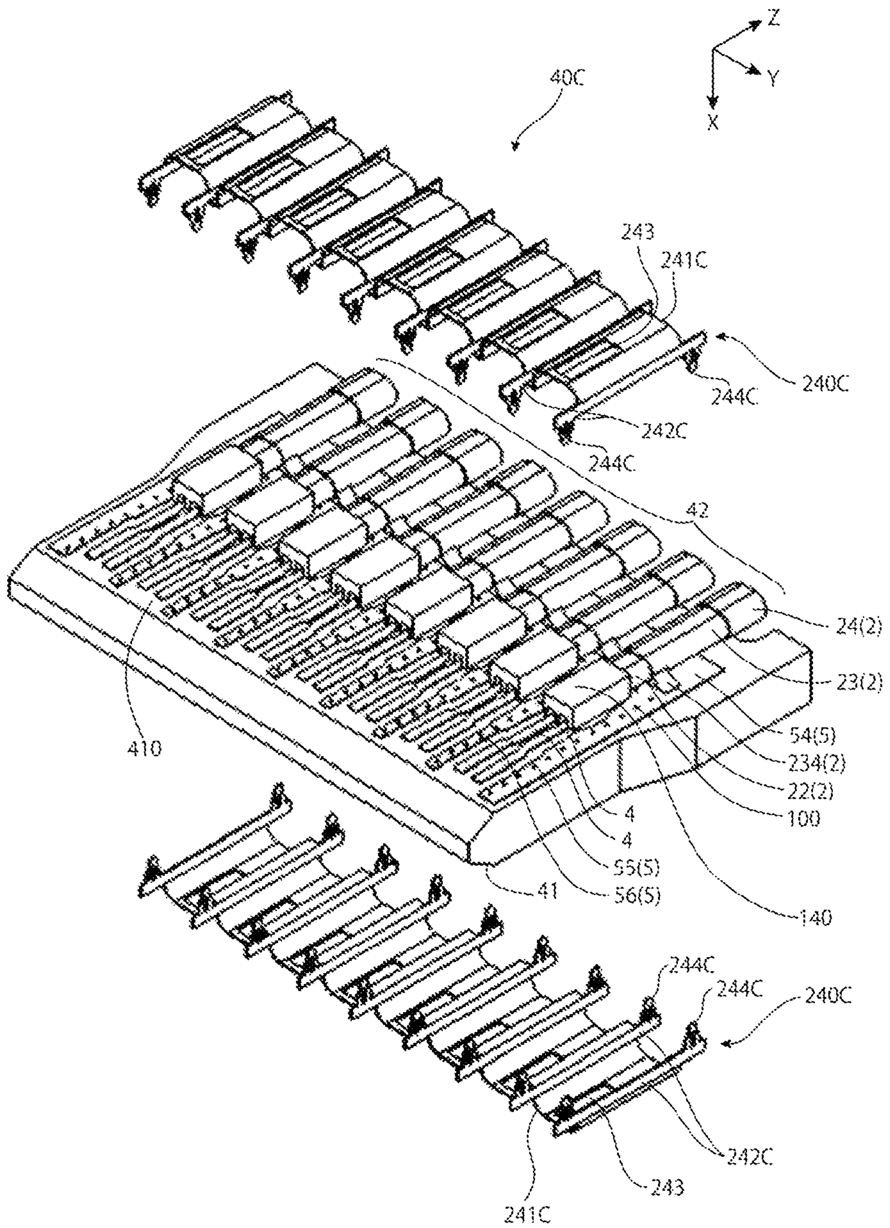
FIG. 43 is a diagram showing a cable assembly 40C according to the tenth embodiment of the present disclosure.

Next, the tenth embodiment of the present disclosure is described. FIG. 43 is a diagram showing a cable assembly 40C according to the tenth embodiment of the present disclosure. In this diagram, the same elements as those in the first to ninth embodiments are denoted by the same reference numerals, and a further description thereof will be omitted.

In the present embodiment, the ground cover 240 of the eighth embodiment is replaced with a ground cover 240C. The width of the flat plate portion 242C of the ground cover 240C in the Z direction is wider than the width of the curved portion 241C in the Z direction, and the end portions of the flat plate portion 242C project to the +Z side and −Z side of the curved portion 241C. Press-fit terminals 244C are provided on the +Z side and −Z side of the flat plate portion 242C.

Here, in the present embodiment, holes with a width enough to settle the press-fit terminals 244C of the ground cover 240C are formed in the extension portions 55 and 56 of the first electrode 5 for ground on the paddle card substrate 41. The press-fit terminals 244C of the ground cover 240 are inserted into and fixed to the holes of the extension portions 55 and 56 of the first electrode 5 for ground.

The details of the configuration of the present embodiment are explained above. The same effect as that of the above eighth to ninth embodiments is obtained according to the present embodiment.

Eleventh Embodiment

Figure 44:
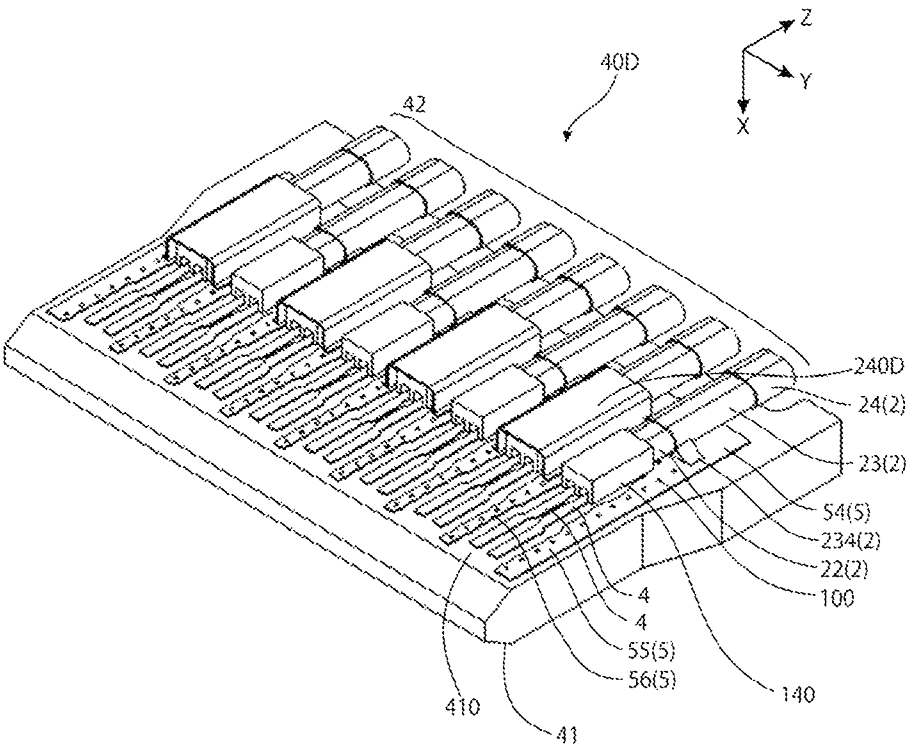
FIG. 44 is a diagram showing a cable assembly 40D according to the eleventh embodiment of the present disclosure.
Figure 45:
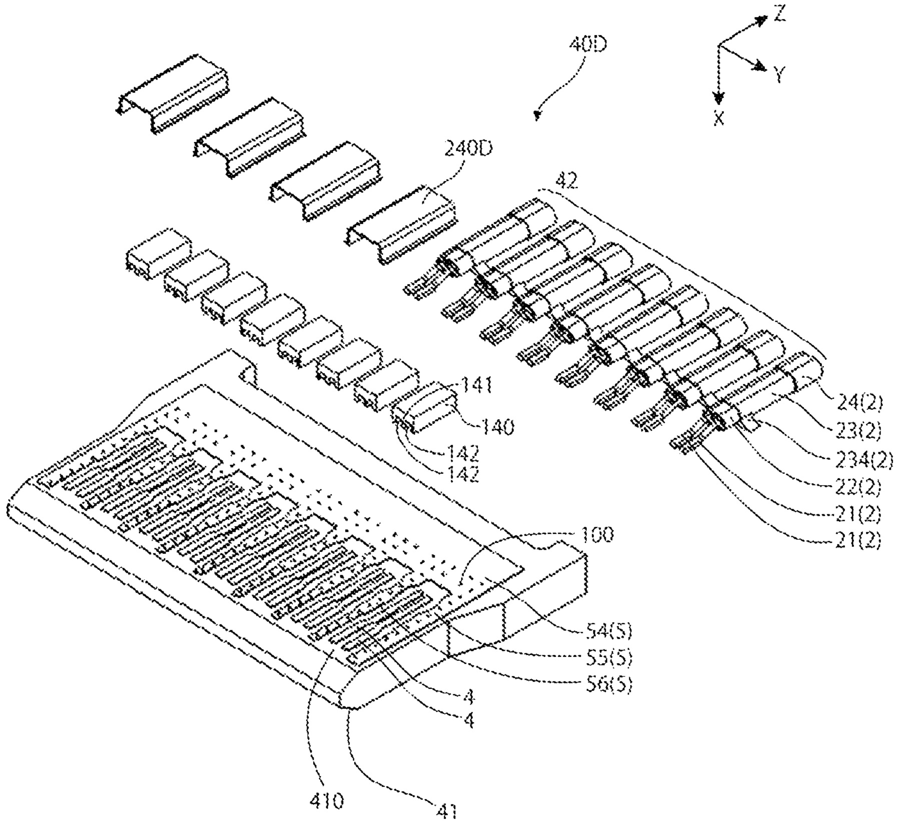
FIG. 45 is an exploded view of FIG. 44.

Next, the eleventh embodiment of the present disclosure is described. FIG. 44 is a diagram showing a cable assembly 40D according to the eleventh embodiment of the present disclosure. FIG. 45 is an exploded view of FIG. 44. In these figures, the same elements as those in the first to tenth embodiments are denoted by the same reference numerals, and a further description thereof will be omitted.

In the present embodiment, the ground cover 240 of the eighth embodiment is replaced with four ground covers 240 D. The ground cover 240D is formed by folding a metal plate into a U shape, and outwardly expanding both tip end portions of the bent tips. The ground covers 240D are fixed to the paddle card substrate 41 so as to cover every other plastic member 140 (specifically, the plastic member 140 at the end on the −Y side, the third plastic member 140 from the end on the −Y side, the fifth plastic member 140 from the end on the −Y side, and the seventh plastic member 140 from the end on the −Y side) and their dielectric bodies 22 on the paddle card substrate 41, and the substrate side contact portions 234.

The details of the configuration of the present embodiment are explained above. The same effect as that of the above mentioned eighth to tenth embodiments is obtained according to the present embodiment.

Figure 46:
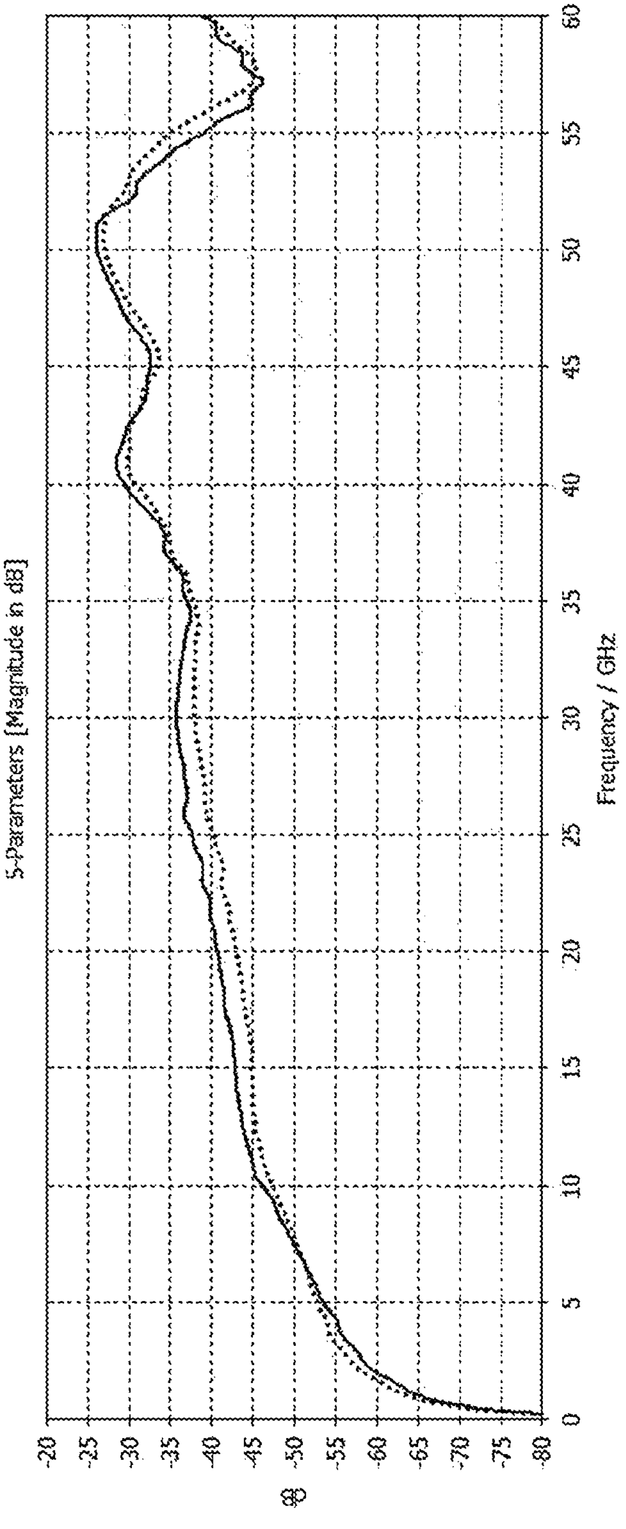
FIG. 46 is a diagram showing respective frequency characteristics of a FEXT of the cable assembly 40A, a FEXT of the cable assembly 40D, and a FEXT of the cable assembly 40D without the ground cover 240.

Here, the inventor of the present application performed the following verification to confirm the effect of the present disclosure. The inventor of the present application calculated the FEXT of the cable assembly 40A, the FEXT of the cable assembly 40D, and the FEXT of the cable assembly 40D without the ground covers 240D by using an electromagnetic field analysis software. FIG. 46 is a diagram showing this simulation result. In FIG. 46, the one-dot chain line is the frequency characteristic of the cable assembly 40A, the broken line is the frequency characteristic of the cable assembly 40D, and the solid line is the frequency characteristic of the cable assembly 40D without the ground covers 240D.

Referring to FIG. 46, it can be seen that the cable assembly 40D of the present embodiment and the cable assembly 40A of the above eighth embodiment have comparable FEXT over almost all bands, and the FEXT of that without the ground covers 240 is inferior to the cable assembly 40D and the cable assembly 40A.

What is claimed is:

1. A connector for high-speed transmission, comprising:

an insulator with a slot into which a paddle card substrate is fitted;

a plurality of contacts for signal which are disposed at a wall portion surrounding the slot of the insulator and come into contact with electrodes for signal of the paddle card substrate when the paddle card substrate is fitted into the slot;

a plurality of contacts for ground disposed at a wall portion surrounding the slot, and coming into contact with electrodes for ground of the paddle card substrate when the paddle card substrate is fitted into the slot; and a conductive resin disposed in the insulator, wherein the conductive resin comprises a protrusion portion facing the contact for ground, and wherein the conductive resin is not electrically connected to the contact for signal and is electrically connected to the contact for ground via the protrusion portion.

2. The connector for high-speed transmission according to claim 1, wherein the conductive resin is fitted into a recess portion provided on a side surface of the insulator.

3. The connector for high-speed transmission according to claim 1, wherein the conductive resin is fitted into the slot from a side opposite to the side where the paddle card substrate is fitted.

4. A connector for high-speed transmission, comprising:

an insulator with a slot into which a paddle card substrate is fitted;

a plurality of contacts for signal which are disposed at a wall portion surrounding the slot of the insulator and come into contact with electrodes for signal of the paddle card substrate when the paddle card substrate is fitted into the slot;

a plurality of contacts for ground which are disposed at a wall portion surrounding the slot and come into contact with electrodes for ground of the paddle card substrate when the paddle card substrate is fitted into the slot; and a metal member disposed in the insulator, wherein the metal member comprises a protrusion portion facing the contact for ground, and the metal member is not electrically connected to the contact for signal and is electrically connected to the contact for ground via the protrusion portion.

5. The connector for high-speed transmission according to claim 4, wherein the metal member is fitted into a recess portion provided on a side surface of the insulator.

6. The connector for high-speed transmission according to claim 4, wherein the metal member is fitted into the slot from a side opposite to the side where the paddle card substrate is fitted.

* * * * *